United States Patent
Mandal et al.

(10) Patent No.: US 7,043,732 B2
(45) Date of Patent: *May 9, 2006

(54) METHOD AND APPARATUS FOR MANAGING REMOTE DATA REPLICATION USING CIM PROVIDERS IN A DISTRIBUTED COMPUTER SYSTEM

(75) Inventors: Chhandomay Mandal, Nashua, NH (US); Jillian I. DaCosta, Nashua, NH (US); Lanshan Cao, Andover, MA (US); Roberta A. Pokigo, Billerica, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 700 days.

This patent is subject to a terminal disclaimer.

(21) Appl. No.: 10/134,711

(22) Filed: Apr. 29, 2002

(65) Prior Publication Data

US 2003/0204557 A1    Oct. 30, 2003

(51) Int. Cl.
*G06F 15/163*   (2006.01)

(52) U.S. Cl. .................................. 719/310; 719/328

(58) Field of Classification Search ............... 719/319, 719/328, 310
See application file for complete search history.

(56) References Cited

U.S. PATENT DOCUMENTS

| 5,819,020 A * | 10/1998 | Beeler, Jr. ............... 714/5 |
| 6,381,654 B1 * | 4/2002 | Brawn et al. ........... 719/331 |
| 6,549,916 B1 * | 4/2003 | Sedlar ..................... 707/200 |
| 2002/0004856 A1 * | 1/2002 | Sudarshan et al. ...... 719/310 |

OTHER PUBLICATIONS

CI, Distributed Management task force, Inc, "common information Model ( CIM) sepecification" version 2.2, Jun. 14, 1999.*

* cited by examiner

*Primary Examiner*—William Thomson
*Assistant Examiner*—LeChi Truong
(74) *Attorney, Agent, or Firm*—Kudirka & Jobse, LLP

(57) ABSTRACT

In accordance with the principles of the present invention, management of a data replication system is provided by a three-tiered arrangement. The lowest, or agent, tier comprises Common Information Model (CIM) provider objects that reside in the hosts providing the data replication service and that can make method calls on the low-level kernel routines. The middle, or logic, tier is a set of federated Java beans that communicate with each other, with the management facades and with the upper tier of the system. The upper, or presentation, tier of the inventive system comprises web-based presentation programs that can be directly manipulated by management personnel to view and control the data replication system.

23 Claims, 18 Drawing Sheets

METHOD AND APPARATUS FOR MANAGING REMOTE DATA REPLICATION USING CIM PROVIDERS IN A DISTRIBUTED COMPUTER SYSTEM

FIELD OF THE INVENTION

This invention relates to networked computer systems and to data replication and mirroring of data in distributed data storage devices that are connected by a network.

BACKGROUND OF THE INVENTION

It is common in many contemporary computer systems to require continuous access to stored information. The conventional data center procedure of taking data storage systems offline to update and backup information is not possible in these computer systems. However, system reliability demands the backup of crucial data and fast access to the data copies in order to recover quickly from human errors, power failures and software bugs. In order to recover from natural disasters, it is common to share data among geographically dispersed data centers.

The prior art has generated several solutions to meet the aforementioned data backup and sharing needs. One prior art solution is data replication in which a second copy or "mirror" of information located at a primary site is maintained at a secondary site. This mirror is often called a "remote mirror" if the secondary site is located away from the primary site. When changes are made to the primary data, updates are also made to the secondary data so that the primary data and the secondary data remain "synchronized."

Data replication can be performed at various levels. For example, the entire database may be mirrored. However, tight synchronization between the primary and mirrored data for an entire database often introduces a significant system performance penalty because of the large number of data update transmissions between the primary and secondary sites that are necessary to ensure transaction and record consistency across the entire database.

To improve system performance when data replication is used, some data replication systems replicate only portions of the data. For example, replication may take place at file-level. Conventional file-level replication systems are often incorporated in the software drivers on the host and generally employ conventional networking protocols, such as TCP/IP, to connect to the remote data site over a local or wide area connection.

Alternatively, in other prior art systems, data replication takes place at the volume level, where a volume is a logical, or physical, disk segment. Instead of replicating database transactions or file systems, this technique replicates logical or, in some cases, physical disk volumes. Volume replication is flexible in the sense that it is generally independent of the file system and volume manager software. Volume replication can also be used in conjunction with database and file replication to help ensure that not just the data specific to the database or a particular file system, but all relevant data is replicated to the remote site.

There are principally two techniques commonly used for data replication: synchronous and asynchronous replication. Synchronous techniques forward data writes generated by the host to the remote site and await confirmation that the remote data has been updated before signaling I/O completion to the requesting host. Synchronous replication has the advantage that, if the primary site is rendered inoperative, the secondary (remote) copy may be used to continue operations after the user community and the applications are switched to the alternate site.

One problem with synchronous replication is that all data must be safely committed to the remote site before the local host write is acknowledged. Consequently, synchronous mirroring is generally limited to relatively short distances (tens of kilometers) because of the detrimental effect of round-trip propagation delay on I/O response times. In addition, if the remote storage is unavailable or the link between the local and remote sites is disabled for a prolonged time period, the host cannot complete its processing and business disruption occurs, even though the primary site has a perfectly operational system.

It is possible to avoid this problem, by maintaining the synchronous writes only when the remote site is available. If the remote site becomes unavailable, then the primary site keeps track of all data writes and the remote site is updated when the remote service is reliably restored. This approach trades recovery time in favor of higher data availability by eliminating the single point of failure produced by the remote storage site.

Alternatively, asynchronous replication methods can be used. Asynchronous techniques affirm primary I/O completion to the originating host before updating the remote data. However, if the link connecting the primary and secondary sites has significant latency, local writes must be queued at the primary site for later transmission when the site link is available. Consequently, in these situations, there is a higher possibility of losing buffered and in-flight data if the primary system fails. A non-volatile memory is needed to prevent data loss in this situation.

Occasionally, remote mirroring operations are interrupted either intentionally or by unplanned outages. If either the primary data or the secondary data continues to be updated during this period, then the data images are no longer synchronized. Resynchronization is the process of re-establishing mirrored images once the remote copy service is restored. Full resynchronization is accomplished by making a complete copy of the data and is time-consuming. One way to reduce resynchronization time is to log data changes during the interruption. Journals and scoreboards (bit-vectors) are two recognized ways to accomplish this logging. Journals capture every new write in a running log, whereas scoreboards keep track of changed locations. Then the changes are used to perform an update synchronization in which the changes are applied to the data copy as it appeared before the interruption.

No matter which of the data replication systems are used, a significant amount of management time can be consumed in initially setting up the data replication system and managing it after it is running. In particular, the data manipulation processes, which actually perform the data updates and synchronization, are typically low-level routines that are part of an operating system kernel running on a particular machine. These routines typically must run on that machine and are written in platform-dependent language. However, in a large, distributed computer system connected by a network, management personnel and resources may be physically located anywhere in the system. Thus, it becomes time-consuming to contact both the primary and secondary storage systems from what can be a remote location to ascertain if space in these systems is available, reserve the space in the respective systems, configure the low level routines to perform the data replication and then access a configuration database that can also be located anywhere on the network to record the particular data replication configuration so that other system managers will not attempt to use resources that have already been reserved.

Therefore, there is a need to provide a simple, fast way to set up and manage a data replication system among resources that may be located anywhere in a distributed system and to provide coordination information to a manager who may also be located anywhere in the system.

SUMMARY OF THE INVENTION

In accordance with the principles of the present invention, management of a data replication system is provided by a three-tiered arrangement. The lowest, or agent, tier comprises Common Information Model (CIM) provider objects that reside in the hosts providing the data replication service and that can make method calls on the low-level kernel routines. The middle, or logic, tier is a set of federated Java beans that communicate with each other, with the management facades and with the upper tier of the system. The upper, or presentation, tier of the inventive system comprises web-based presentation programs that can be directly manipulated by management personnel to view and control the data replication system.

In one embodiment, each CIM provider instance operates in a CIM object manager (CIMOM) running in each host providing the data replication service. Each CIM provider is, in turn, represented by a management facade that is created and deleted by a management facade factory when the CIM provider instance is created and deleted.

In one embodiment, a data replication management facade runs on a selected host in the distributed computer system and the federated beans, including at least one data replication bean, also run on that host. A manager can interact with the beans via web-based graphic user interfaces (GUIs) that use a lookup service to obtain a proxy to selected federated beans. The GUIs then use that proxy to make methods calls on the beans to manage the data services controlled by the beans.

In another embodiment, the data replication management facade and the federated beans run on a dedicated management server that is connected to the hosts by a network and is located in a shared Jiro™ station.

In yet another embodiment, another federated bean stores the configuration of the data replication system. This latter bean can be interrogated by the data replication bean to determine the current system configuration.

In still another embodiment, a data service volume bean locates and prepares volumes that can be used by the data replication system.

BRIEF DESCRIPTION OF THE DRAWINGS

The above and further advantages of the invention may be better understood by referring to the following description in conjunction with the accompanying drawings in which.

DETAILED DESCRIPTION

Figure 1:
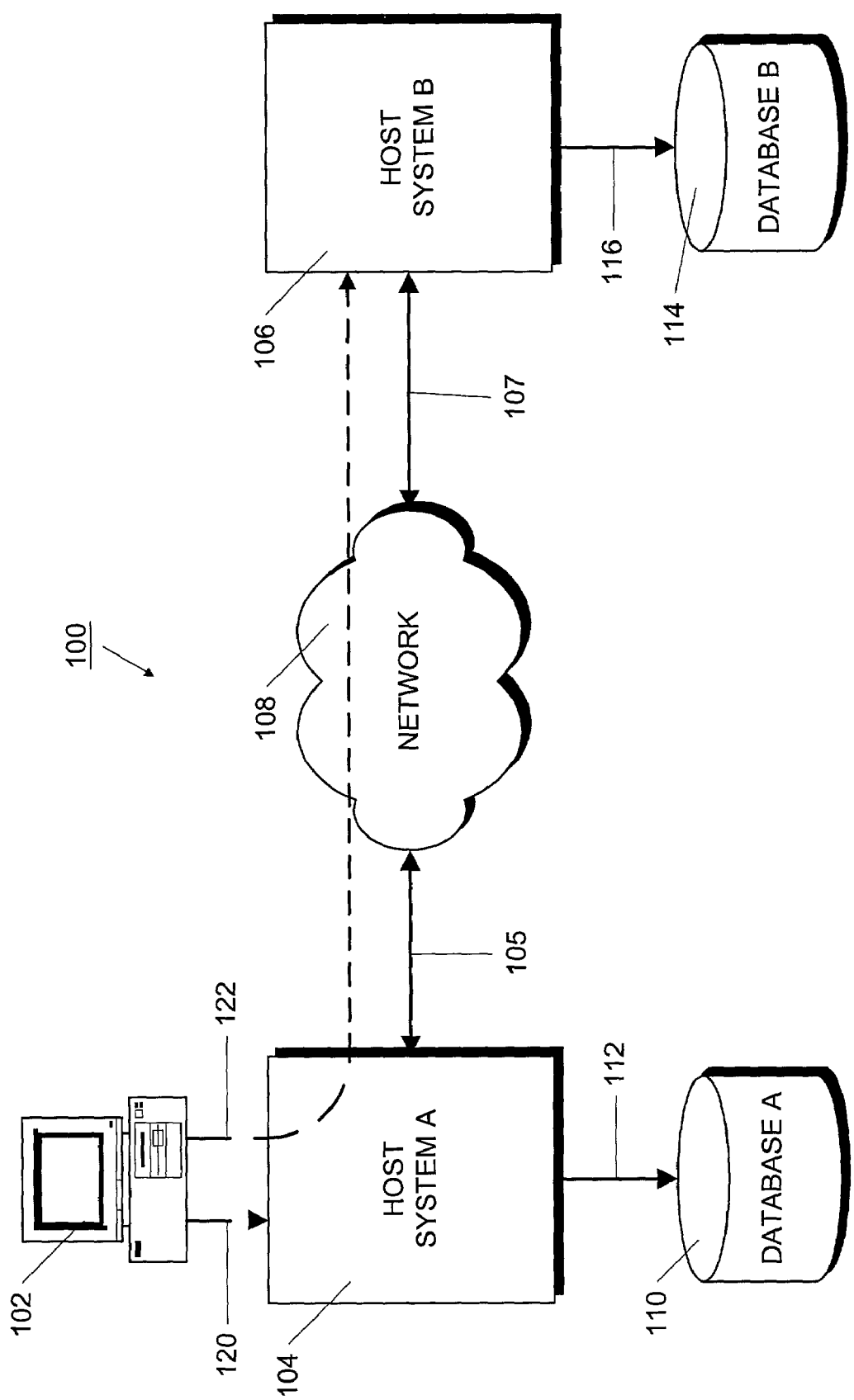
FIG. 1 is a block schematic diagram of a conventional data replication system.

FIG. 1 illustrates a conventional data replication system 100. In this system, a system manager represented schematically by console 102 is connected to a first host system (Host A) 104. Host A is, in turn, connected to a second host system (Host B) 106 by a network 108 as indicated schematically be arrows 105 and 107.

Each of the host systems 104, 106 has associated therewith a storage component. For example, host 104 has database component 110 associated with it, as indicated by arrow 112, and host 106 has database component 114 associated with it as indicated by arrow 116. Each host system 104, 106 can control the assignment of storage space and the transfer of information from and to its associated storage component 110, 114, respectively. As previously mentioned, data replication systems can replicate data at various levels including file, volume and database levels. However, in order to simplify the following discussion, it will be assumed that data replication is carried out at the volume level.

The data manipulation processes that actually perform the data updates and synchronization are low-level routines that are part of an operating system kernel running on both host systems 104 and 106. These routines typically must run on their respective machines and control the storage component that is associated with a machine. Thus, in prior art systems, in order to set up a data replication system in the configuration shown in FIG. 1, the manager would log onto host system A 104 as schematically indicated by arrow 120 and locate and reserve a volume in the storage component 110. This latter volume would be termed the primary volume. Then, the manager would log onto host system B 106, locate, and reserve a volume for the mirror volume in storage component 114. This latter volume would be deemed the secondary volume.

Next, the manager would start the data replication software in both host systems A and B so that data would be replicated from the primary volume in storage component 110 to the secondary volume in storage component 114, via the network 108. Thereafter, data replication takes place automatically, unless a failure is encountered. In that case, the manager would have to log onto both host systems 104, 106 and configure the data replication software to perform a volume synchronization as appropriate. Therefore, a significant amount of management time can be consumed in initially setting up the data replication system and managing it after it is running.

Figure 2:
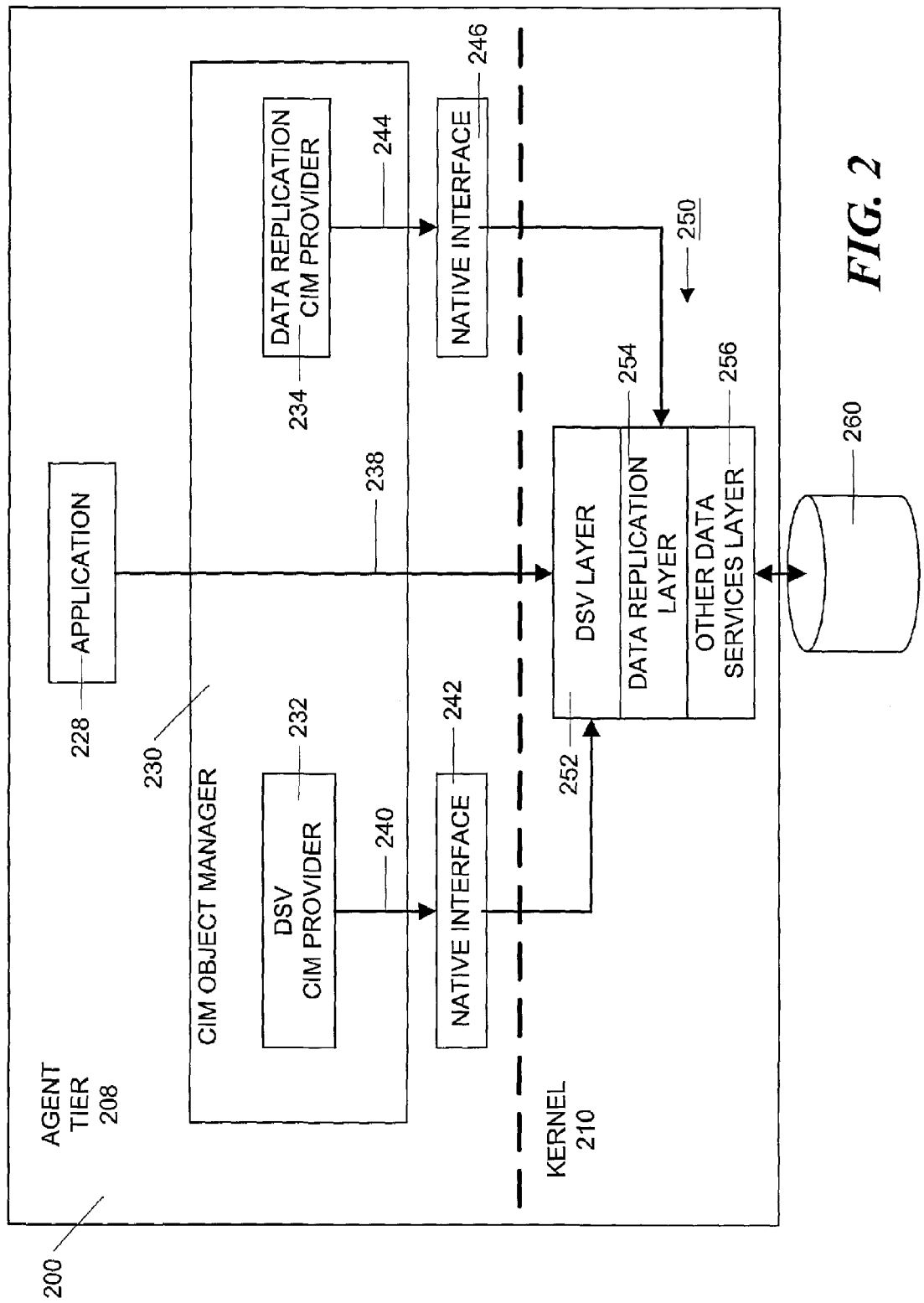
FIG. 2 is a block schematic diagram of a lower or agent tier comprising a CIM object manager and CIM providers.

FIG. 2 shows a host system 200 that illustrates the contents of an agent tier running in a single host. Two such hosts would be used to provide the data replication services, called storage network data replication (SNDR) services. The data replication management capability of the invention is actually implemented in the kernel layer 210 shown running in the hosts, such as host 200 in FIG. 2. In particular, access by the host 200 to a resource 260, which can be a data storage component, is provided by a layered stack 250 comprising a data service layer 252, a data replication layer 254 and other data service layers 256. Application programs running in host 200, such as application 228, and the host file system access resource 260 though the layered stack 250 as indicated schematically by arrow 238. Data services have some common usage rules and the data service layer 252 is provided to assist the services. For example, any data storage volume used by the data replication service must be identified to the data service volume service. The DSV service controls the DSV kernel layer 252 that provides data redirection. In particular, the DSV layer 252 insinuates itself between a standard block device driver used to access the storage and the underlying drivers and shunts I/O information through the other data service kernel modules 254 and 256 to allow them to manage the data and provide the requested services.

In order to provide for data service management capability in accordance with the principles of the invention, the data services layer 252 and the data replication layer 254 are controlled by software running on the lower tier 208 of the inventive data replication system. The lower tier includes a native interface 242 that converts the APIs exported by the data services layer 252 into a platform-independent language, such as Java™.

An object, called a CIM provider 232, provides the required remote management capability and controls the native interface 242 as indicated schematically by arrow 240. The Common Information Model, or CIM, is an object-oriented information model for describing managed resources such as disks, CPUs, and operating systems. This model is a proposed industry standard that is promulgated by the Distributed Management Task Force, Inc. and is described in detail in the Common Information Model Specification, version 2.2, Jun. 14, 1999. This document is available at website dmtf.org and is incorporated by reference in its entirety.

CIM describes overall management information in a network enterprise environment and is comprised of a Specification and a Schema. The Specification defines the details for integration with other management models, while the Schema provides the actual model descriptions In the CIM model, CIM objects represent managed resources, such as printers, disk drives, or CPUs. CIM objects can be shared by any WBEM-enabled system, device, or application. CIM objects with similar properties and purposes are represented as CIM classes. Properties are attributes that describe a unit of data for a class. An instance is a representation of a managed object that belongs to a particular class. Instances contain actual data. For example, Solaris_ComputerSystem is a CIM class that represents a computer that runs the Solaris™ operating environment. Solaris is a trademark of Sun Microsystems, Inc. The Solaris software that runs on a SUN workstation is an instance of the Solaris_OperatingSystem class. ResetCapability and Install-Date are examples of properties of the Solaris_ComputerSystem class.

Each schema comprises a meaningful collection of CIM classes with a single owner (an organization). Schemas are used for administration and class naming and each CIM class can belong to only one schema. All class names must be unique within a particular schema. The schema name is the determining factor in differentiating classes and properties from others that may have the same name.

The Common Information Model categorizes information from general to specific and each CIM schema is divided into three layers of information. These include a core layer that comprises a subset of CIM not specific to any platform and a common layer that comprises information which visually depicts concepts, functionality, and representations of entities related to specific areas of network management, such as systems, devices, and applications. The third layer is an extension layer that comprises information models that support the CIM Schema and represent a very specific platform, protocol, or corporate brand.

CIM objects are, in turn, managed by a CIM Object Manager (CIMOM) that stores the CIM objects internally as Java classes. A Managed Object Format (MOF) language is used to specify a CIM schema. Classes and instances are defined using either Unicode or UTF-8, and placed in a MOF file that resides in the CIM Object manager. When the CIM object manager starts, the MOF files are submitted to a MOF compiler. The MOF compiler parses the file and adds the classes and instances defined in the file to the CIM Object Manager repository.

When a client application accesses information about a CIM object, the CIM Object Manager contacts either an appropriate CIM "provider" for that object or a CIM Object Manager repository that contains data regarding the objects. A CIM provider is a class that communicates with managed objects to access data.

More specifically, when a client application requests data from a managed resource and the data is not available from the CIM Object Manager repository, the CIM Object Manager forwards the request to the provider for that managed resource using object provider APIs to communicate with providers. The provider then contacts the resource and dynamically retrieves the information. For example, in response to a request from the CIM Object Manager to retrieve information regarding a device, a provider gets native information from a device, maps the native information format to CIM classes, and passes the information to the CIM Object Manager in the form of the CIM classes. In response to a request to send information to a device, a provider maps the information from CIM classes to native device format, gets the required information from the CIM class and passes the information to the device in native device format.

In FIG. 2, two CIM providers are shown in CIM object manager 230. These include the data service volume CIM provider 232 that interfaces with native interface 242 as indicated schematically by arrow 240 to send information to, and receives information from, the data service volume layer 252 and CIM provider 234 that interfaces with native interface 246, as indicated schematically by arrow 244, to pass information to and from data replication layer 254. CIM provider 234 actually represents a plurality of data replication CIM providers that manage individual components of the data replication services provided by data service layer 254. These providers are shown in more detail in FIG. 3.

Similarly, one or more providers and native interfaces would be provided for each specific data service that is running on the host and controlled by other layers 256. For example, the host shown in FIG. 2 could be running one or more data services, including data imaging services, cache management services, and data volume configuration services.

Figure 3:
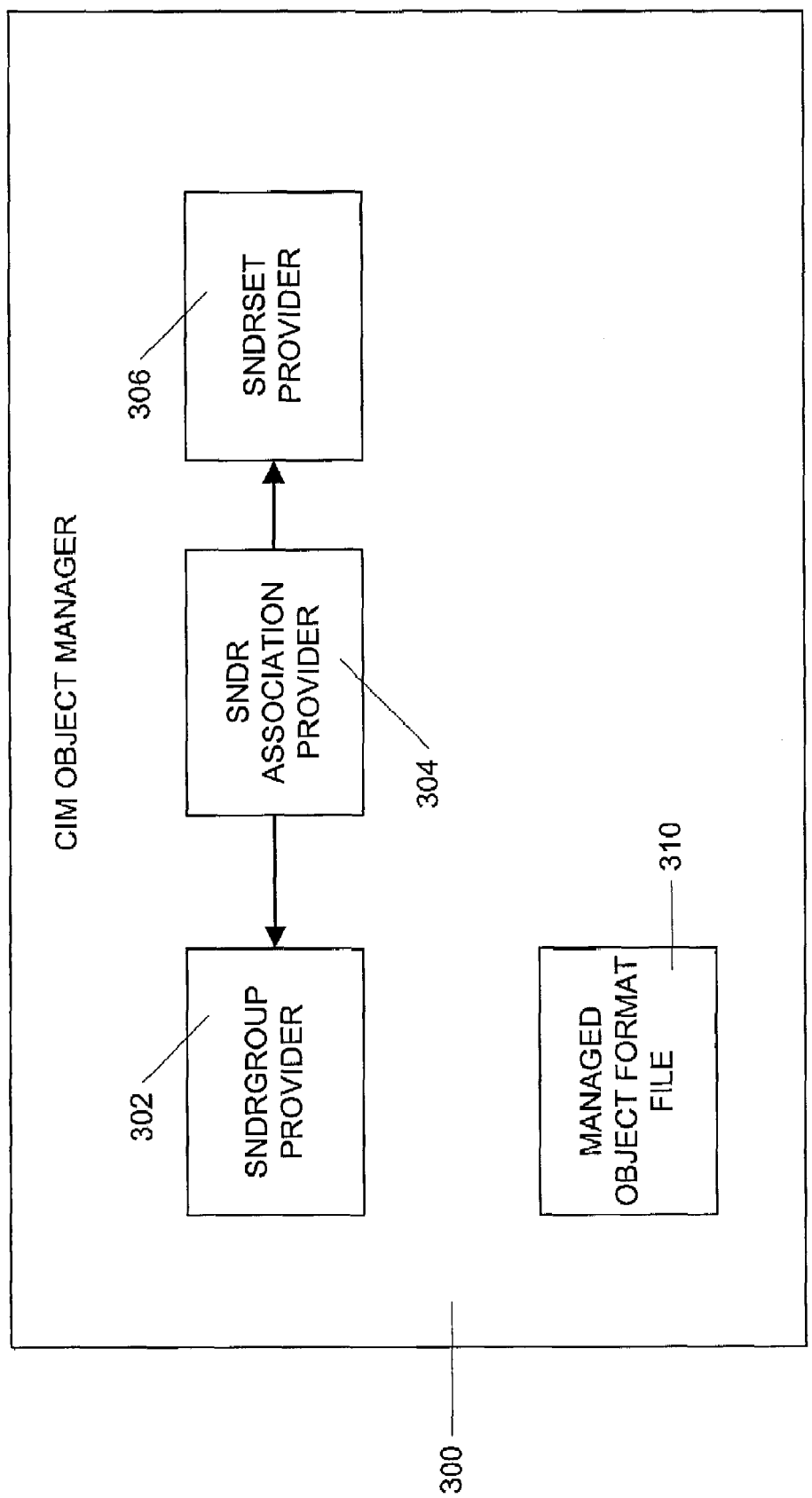
FIG. 3 is a schematic block diagram illustrating several CIM providers operating in a CIM object manager.

FIG. 3 illustrates the CIM providers that are used to implement the data replication service. In order to understand the operation of the data replication CIM providers, the concept of a SNDRSet construct and a SNDRGroup construct need to be introduced. The granularity of remote mirroring as provided by the inventive data replication system is a logical volume. However, the SNDR layer 254 needs a collection of information in order to provide the remote mirroring capability on a logical volume basis. In addition, the data replication system needs additional information in order to easily manage the remote mirroring. This collection of information is encapsulated in the SNDRSet construct and a SNDRGroup construct. As mentioned previously, the host from which data is mirrored is denoted as a primary host, and the host to which data is mirrored is denoted as a secondary host. The term primary and secondary is relative to each individual SNDRSet and SNDRGroup constructs.

A SNDRSet construct is the logical entity that provides remote mirroring capability on a logical volume basis. It contains information which is necessary for a SNDR layer, such as layer 254, to provide remote mirroring, such as: mode of operation (synchronous or asynchronous), primary host name, primary volume name, primary bitmap name, secondary host name, secondary volume name, secondary bitmap name, direct I/O device name (if applicable), group to which the set belongs (if any), and the maximum number of writes as well as 512 byte blocks (FBAs) that can be queued (in case of asynchronous remote mirroring for the set).

Some additional information is also included in the SNDRSet. This information includes: a user provided (unique) name of the SNDRSet, whether to resynchronize automatically after failure, and whether to use a completely "clean" or "dirty" bitmap (whether the volumes are synchronized or not) when remote mirroring is enabled.

A SNDRSet construct is uniquely identifiable by the secondary host name and secondary volume name, since one logical volume in a particular host cannot be used as a mirroring target for more than one logical volume in the data replication system. However, a logical volume can be mirrored to multiple logical volumes in one or more hosts. This is commonly referred as a "one-to-many" configuration in the data replication system. It may be noted that a one-to-many configuration does not correspond to a single SNDRSet construct. Instead, each primary and secondary volume pair constitutes a unique SNDRSet construct. Thus, a one-to-many configuration corresponds to multiple SNDRSet constructs that happen to have the same primary volume remotely mirrored.

Similarly, a volume in a host can be remotely mirrored to a volume in another host, which, in turn, can be remotely mirrored to another volume in a different host. This is referred as a "multi-hop" configuration in the data replication system. As with a one-to-many configuration, a multi-hop configuration also does not correspond to a single SNDRSet construct. Instead, each hop constitutes a unique SNDRSet construct.

Finally, in another configuration called a "campus" data replication, a secondary volume is exported to the primary host. In this case, the primary host has a valid pathname to a volume that coincides with the secondary volume in the secondary host. This situation does correspond to a single SNDRSet construct.

A SNDRSet object embodying the SNDRSet construct is created when the necessary information is provided. This information is required at both the primary and secondary hosts. If any configuration information is changed in one SNDRSet object, the same information must be changed for both the primary and secondary hosts.

Once a SNDRSet construct is created, several operations can be performed on it, if allowed. First, there are operations that may, or may not, be performed simultaneously at both the primary host and secondary host. These operations include enabling the data replication, disabling the data replication, suspending the data replication, resuming a suspended operation and logging operations. There are also operations that can be initiated only from the primary host. These include full forward synchronization, updating forward synchronization, full reverse synchronization and updating reverse synchronization.

A set of reconfiguration operations can also be performed on the SNDRSet. These operations, which have to be performed simultaneously at primary host and the secondary host, include reconfiguring the user-provided set name, reconfiguring the primary bitmap, reconfiguring the secondary bitmap, reconfiguring the group membership, reconfiguring the direct I/O device, reconfiguring automatic resynchronization, reconfiguring the maximum number of writes pending in the queue and reconfiguring the maximum number of FBAs queued.

The operations that are allowed on a particular SNDRSet construct depend on the state of the SNDRSet construct. A SNDRSet construct will be in one of three mutually exclusive states: enabled, disabled and suspended. When the SNDRSET construct is in the enabled state, it must be in one of the following mutually exclusive states: logging writes, replicating writes, forward synchronization in progress, and reverse synchronization in progress.

There are also seven other auxiliary states that a SNDRSet can be in. These include "golden" (no error to report), local volume failed, local bitmap failed, remote network interface failed, direct I/O device failed (in case of campus SNDR), forward synchronization needed and reverse synchronization needed.

When a SNDRSet object is created, it is initialized in the disabled state. However, the user can specify whether a SNDRSet should be enabled at the time of its creation. An enable operation can be performed on a SNDRSet if it is in the disabled state. A disable operation can be performed any time unless the SNDRSet is in a suspended state. The suspend and resume operations are not exposed to the user; instead, they are used by startup and shutdown scripts. A SNDRSet can be suspended if it is not in disabled state, and can be resumed only if it is in suspended state. A logging operation can be applied on the SNDRSet anytime at the primary site. A logging operation can also be applied any time at the secondary site except when a volume synchronization (forward or backward) is in progress. In addition, reconfigure operations that involve bitmaps cannot be used when a volume synchronization (forward or backward) is in progress.

These synchronization operations may be complicated if one-to-many and multi-hop configurations are involved. However, if those configurations are not involved, forward synchronization is permitted if the SNDRSet is not in a reverse-synchronization-needed state and the SNDRSet is not part of a one-to-many configuration where some SNDR set is in a synchronization-needed state. Reverse synchronization is disallowed if the SNDRSet is in a forward-synchronization-needed state.

In a one-to-many configuration, reverse synchronization is not allowed if any other SNDRSet that is part of the one-to-many configuration is doing forward or reverse synchronization or replicating writes. In a multi-hop configuration, if a hop is doing reverse synchronization, then the previous hop can not perform forward synchronization. Similarly, if one hop is doing synchronization (forward or reverse) or replicating writes, then the next hop can not perform reverse synchronization. However, the previous hop can perform reverse synchronization if the next hop is replicating or logging writes (and not in the process of synchronizing).

A SNDRGroup is a collection of SNDRSets that have the same group name, the same primary host, the same secondary host and the same mode (synchronous/asynchronous) of operation. Write ordering among various member SNDRSets in a SNDRGroup is maintained by the data replication system. This ordering is very important for database and other applications. A SNDRGroup has similar states to those as of a SNDRSet. When an operation is applied to a SNDRGroup, it is actually applied to all of the member SNDRSets. The operation is carried out on each member SNDRSet irrespective of failure of the operation on one or more member SNDRSet. If the operation fails on one or more SNDRSets, then the group enters into an "unknown" state and the user must take corrective actions manually.

A SNDRGroup can optionally be locked. If a SNDRGroup is locked, all configuration changes, such as SNDRSet additions or deletions, are prevented and only SNDRGroup operations (as opposed to individual SNDRSet operations) are allowed on the member SNDRSets. A SNDRGroup can only be deleted if it has no member SNDRSets.

As shown in FIG. 3, the CIM object manager 300 running in the hosts that provide the SNDR services can include several CIM providers of which three are shown in FIG. 3. The illustrated CIM providers include an SNDRSetProvider 306, an SNDRGroupProvider 302 and an SNDRAssociationProvider 304.

The SNDRSetProvider 306 creates and deletes SNDRSet CIM objects in accordance with client requests. For each SNDRSet, the primary host name, primary volume name, primary bitmap volume name, the secondary host name, secondary volume name, secondary bitmap volume name as well as the SNDR operational mode (synchronous or asynchronous) and the set name can be specified during creation. Various keys can be specified, including primary host, volume and bitmap names and secondary host, volume and bitmap names. However, the secondary volume is unique for an SNDRSet and hence can be used to retrieve a specific SNDRSet instance from the CIM object manager repository. Appropriate SNDRSets must be created in both hosts that are to provide the SNDR service.

Various methods that can be invoked on a CIM instance of an SNDRSet include "get" methods for retrieving the set name, primary and secondary bitmap volume names, the primary volume size, whether the primary and secondary bitmaps are enabled and are files, and the direct I/O device name. A fullSync( ) method initiates a primary volume to secondary volume full synchronization process for a specified volume set. If the specified set is assigned to an SNDRGroup, then this operation must be initiated from the associated SNDRGroup.

An updateSync( ) method initiates an update resynchronization for a given SNDRSet. Similarly, a fullReverse( ) method initiates a secondary volume to primary volume full resynchronization process for a specified volume set and an updateReverse( ) method initiates an update reverse resynchronization for a given SNDRSet. If the specified set is assigned to an SNDRGroup, then these latter operations must be initiated from the associated SNDRGroup.

Various other methods, including a reconfigUserName( ) method, a reconfigPrimaryBitmap( ) method, a reconfigSecondaryBitmap( ) method, a reconfigDirectIODevice( ) method, a reconfigGroup method and a reconfigAutoSync( ) method allow various parameters to be changed.

The SNDRGroup Provider 302 creates and deletes SNDRGroups in accordance with client requests. Various methods that can be invoked on a CIM instance of an SNDRGroup include various "set" methods for setting the primary and secondary host names and enabling an autosync mode and various "get" methods for retrieving the group name, group status, the names of SNDRSets in the group, the primary host name and the secondary host name. Additional methods include an addSet( ) method that adds a specified SNDRSet of a compatible type to the group represented by the SNDRGroup object. The added set and the current group must not be in an active operation and the set must not be already contained in another group. Likewise, the removeSet( ) method removes a specified SNDRSet from the group. The removed set and the current group must not be in an active operation.

A fullSync( ) method initiates a primary volume to secondary volume full synchronization process for all SNDRSets in the group as an atomic operation. An updateSync( ) method initiates a primary volume to secondary volume update synchronization process for all SNDRSets in the group.

A fullReverse( ) method initiates a secondary volume to primary volume full synchronization process for all SNDRSets in the group as an atomic operation. An updateReverse( ) method initiates a secondary volume to primary volume update synchronization process for all SNDRSets in the group. An isSetInGroup( ) method tests if the specified SNDRSet is in the current group or returns null if a null value is specified.

The SNDRAssociation Provider 304 relates SNDRSets and SNDRGroups together by providing references to related sets and groups.

The providers are described in a managed object format (MOF) file, which is required and resides in the CIM object manager. A sample MOF file for the three providers discussed above follows.

```
* Title:      DS_SNDR.mof
* Description:mof file for sndr set, group, and association between set,
    group.
* Version       1.0
*/
#pragma Locale ("en-US")
   [Provider("SNDRSetProvider")
   ]
class DS_SNDRSet
{
   // key property for sndr set
   [key]
```

```
String primaryVolName;
[key]
String primaryHostName;
[key]
String secondVolName;
[key]
String secondHostName;
[key]
boolean synchronous;
[key]
String primaryBitmapName;
[key]
String secondBitmapName;
// sndr set config method
String enable(
    [IN]
    boolean groupOp
);
String disable(
    [IN]
    boolean groupOp
);
String suspend(
    [IN]
    boolean groupOp
);
String resume(
    [IN]
    boolean groupOp
);
String log(
    [IN]
    boolean groupOp
);
String fullSync(
    [IN]
    boolean groupOp
    [IN]
    boolean waitTillFinished
);
String fullReverse(
    [IN]
    boolean groupOp
    [IN]
    boolean waitTillFinished
);
String updateSync(
    [IN]
    boolean groupOp
    [IN]
    boolean waitTillFinished
);
String updateReverse(
    [IN]
    boolean groupOp
    [IN]
    boolean waitTillFinished
);
String waitSNDR(
    [IN]
    boolean groupOp
);
String refreshStatus( );
String recofigUserName(
    [IN]
    String userGivenSetName
);
String recofigPrimaryBitmap(
    [IN]
    String primaryBitmap
    [IN]
    boolean bitmapSetAtInit
    [IN]
    boolean bitmapFile
);
String reconfigSecondaryBitmap(
    [IN]
    String secondaryBitmap
    [IN]
    boolean bitmapSetAtInit
    [IN]
    boolean bitmapFile
);
String reconfigDirectIODevice(
    [IN]
    String directIODevice
);
String reconfigGroup(
    [IN]
    String groupName
);
String reconfigAutoSync(
    [IN]
    boolean autoSync
    [IN]
    boolean groupOp
);
// sndr set property methods
String getPrimaryBitmapName( );
String getSecondaryBitmapName( );
String getUserGivenSetName( );
boolean isPrimaryBitmapSetAtEnable( );
boolean isPrimaryBitmapFile( );
int getPrimaryVolumeSize( );
boolean isSecondaryBitmapSetAtEnable( );
boolean isSecondaryBitmapFile( );
String groupName( );
String getDirectIODeviceName( );
boolean isAutoSyncEnable( );
// sndr set status methods
boolean isEnable( );
boolean isVolumeFailed( );
};
[Association,
 Provider("sndrGroupSetProvider")
]
class DS_SNDRGroupSetAssoc
{
    DS_SNDRGroup REF groups;
    DS_SNDRSet REF groupedby;
};
[Provider("SNDRGroupProvider")
]
class DS_SNDRGroup
{
    // sndr group key property
    [key]
    String groupName;
    // sndr group property
    String primaryHostName;
    String secondaryHostName;
    boolean synchronous;
    boolean locked;
    boolean autoSyncEnable;
    boolean primarySide;
    // sndr group methods
    String getGroupName( );
    boolean isSNDRGroupStatusChanged(
        [IN]
        String groupName
    );
    boolean addSet(
        [IN]
        DS_SNDRSet set
    );
    boolean removeSet(
        [IN]
        DS_SNDRSet set
    );
    DS_SNDRSet getSetInGroup( );
    boolean isSetInGroup(
        [IN]
        DS_SNDRSet set
    );
    String lockGroup( );
    String unlockGroup( );
    boolean isGroupLocked( );
    String enable( );
```

-continued

```
String disable( );
String suspend( );
String resume( );
String log( );
String fullSync(
    [IN]
    boolean waitTillFinished
);
String fulReverse(
    [IN]
    boolean waitTillFinished
);
String updateSync(
    [IN]
    boolean waitTillFinished
);
String updateReverse(
    [IN]
    boolean waitTillFinished;
);
    String waitSNDR( );
    String reconfigGroupName(
    [IN]
    String groupName
);
String reconfigAutoSync(
    [IN]
    boolean autoSync
);
// sndr group property methods
String getGroupName( );
boolean setGroupName(
    [IN]
    String groupName
);
String getPrimaryHostName( );
boolean setPrimaryHostName(
    [IN]
    String primaryHostName
);
String getSecondaryHostName( );
boolean setSecondaryHostName(
    [IN]
    String secondaryHostName
);
boolean isSynchronous( );
boolean isLocked( );
boolean isAutoSyncEnabled( );
boolean setAutoSyncEnabled(
    [IN]
    boolean autoSyncEnabled
);
// sndr group status methods
int getSNDRGroupStatus( );
boolean isPrimary( );
boolean isUnknown( );
boolean isEnabled( );
boolean isDisable( );
boolean isSuspended( );
boolean isReplicatingWrites( );
boolean isLoggingWrites( );
boolean isGolden( );
boolean isSetError( );
boolean isNetworkFailed( );
boolean isLocked( );
boolean isUnlocked( );
};
```

Figure 4:
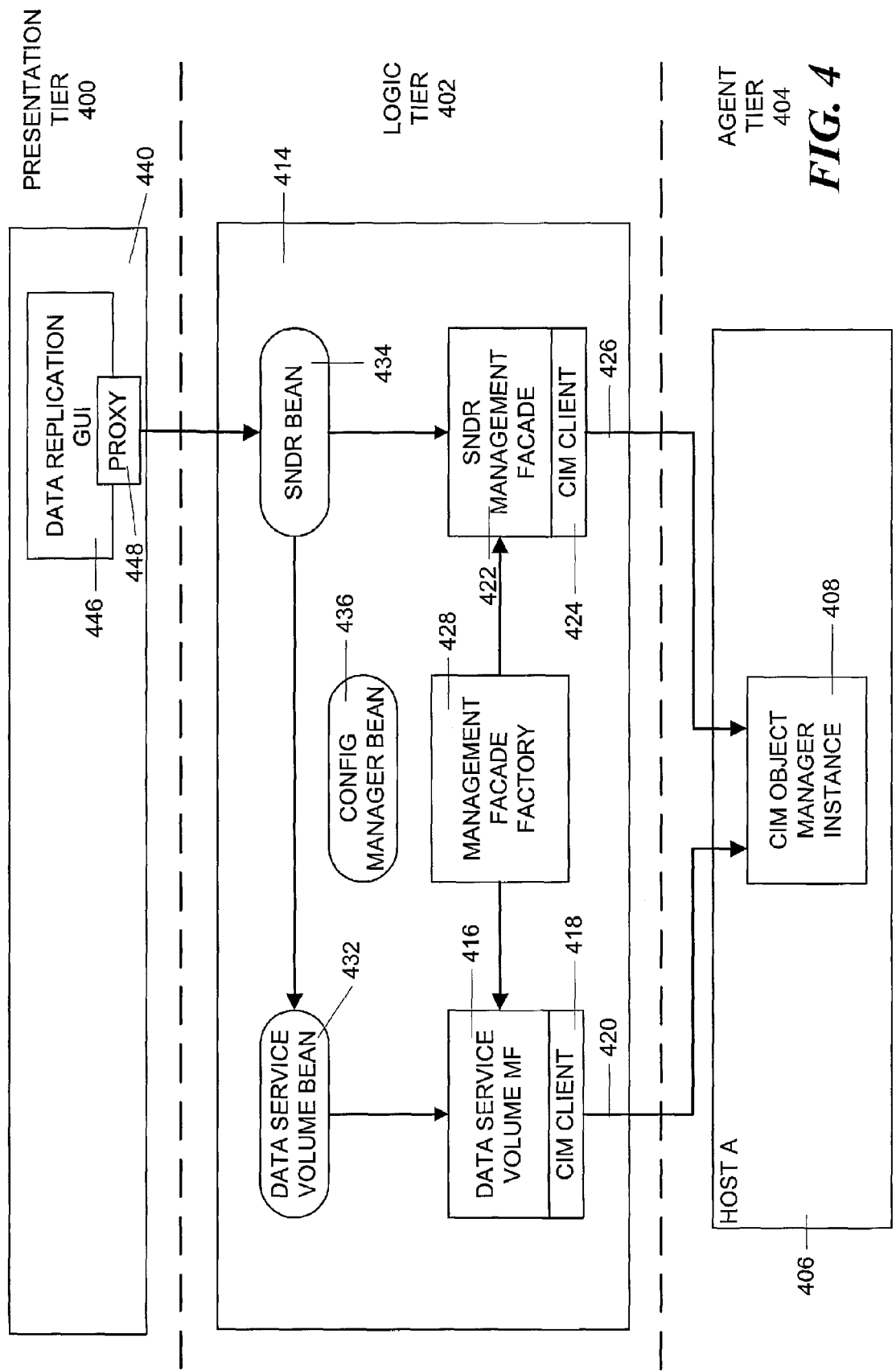
FIG. 4 is a block schematic diagram of a three-tiered data replication system, illustrating an upper presentation tier, a federated bean middle tier and a CIM provider lower tier.

FIG. 4 illustrates the three tiers of the present invention including a presentation tier 400, a logic tier 402 and the agent tier 404. As shown, the agent tier 404 contains a single host 406, but the system may contain additional hosts. Each host would be arranged as shown in FIG. 2 with a CIM object manager and CIM providers. The CIM object manager for host 406 is shown as object manager 408. The providers have been omitted from FIG. 4 for clarity.

CIM data in CIM objects can be accessed by a CIM client in accordance with a protocol called Web Based Enterprise Management (WBEM). WBEM is an industry-wide initiative that includes standards for web-based management of systems, networks, and devices on multiple platforms. This standardization enables system administrators to manage desktops, devices, and networks. WBEM is designed to be compatible with all major existing management protocols, including Simple Network Management Protocol (SNMP), Distributed Management Interface (DMI), and Common Management Information Protocol (CMIP). WBEM encompasses the CIM model, a managed object format (MOF) language for defining CIM classes and instances and an eXtensible Markup Language (XML), a generalized markup language that can be used to describe managed resources on the web. Details concerning the WBEM protocol can be found on the World Wide Web at website sun.com/solaris/wbem.

In FIG. 4, two CIM clients 418 and 424 can access CIM object manager instance 408 over a connection on the network connecting the computer on which the logic tier 402 resides with the host computer 406. This network connection is indicated schematically by arrow 420. A WBEM client application, such as client application 418, contacts a CIM Object Manager, such as manager 408, to establish a connection, shown schematically by arrow 420, when the client needs to perform WBEM operations, such as creating a CIM class or updating a CIM instance. When WBEM client application 418 connects to the CIM object manager 408, the WBEM client 418 gets a reference to the CIM Object Manager 408, which the client then uses to request services and operations.

The clients 418 and 424 are located in the logic tier 402, which may, for example, be part of a management server 414 located in any computer in the distributed system. This latter host could be host 406 or may be a completely different computer system connected to the network. The logic tier 402 is implemented with a plurality of Federated Java™ (trademark of Sun Microsystems, Inc.) beans and management facades. The federated beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at http://java.sun.com/aboutJava/communityprocess/final.html (JSR#9).

The clients 418 and 424 are located in the logic tier 402, which may, for example, be part of a management server 414 located in any computer in the distributed system. This latter host could be host 406 or may be a completely different computer system connected to the network. The logic tier 402 is implemented with a plurality of Federated Java™ (trademark of Sun Microsystems, Inc.) beans and management facades. The federated beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at website java.sun.com/aboutJava/communityprocess/final.html (JSR#9).

In addition, the Jiro™ technology provides a lookup service that is used to register and locate all Jiro™ technology services, including both base and dynamic services, that are available in a management domain. Details of the Jiro™ framework and its use are available in the "Jiro™ Technology SDK Programmer's Reference Manual" available at website jiro.com, which manual is incorporated by reference in its entirety.

For data replication service management purposes, the main federated bean is the storage network data replication (SNDR) bean 434. Bean 434 is a Federated Bean as described in the aforementioned Federated Management Architecture (FMA) specification. When created, it registers itself with a local Jiro™ station, and provides its services to other federated beans within the same Jiro™ management domain.

Bean 434 interacts with a data replication service management facade 422 that, in turn, connects to the CIM client 424. The management facade 422 provides a means by which the CIM client 424 can be accessed and managed as a Jiro™ service, i.e., a service that can be managed in a distributed environment from a remote host. The management facade 422 is essentially an object-oriented model of the CIM client 424 and provides a collection of APIs to manage the CIM client 424. Management facades, such as management facade 422 are created and destroyed by a management facade factory 428. The management facade factory 428 will instantiate and delete data services management facades, such as facade 422, upon receipt of appropriate intrinsic CIM instance creation/deletion events from the CIM object manager 408 when CIM providers (not shown in FIG. 4) are created and deleted in the host 406.

Data services have some common usage rules. For example, any data storage volume used by the data replication service must be identified to volume control data services. Thus, a common data service volume bean 432 is implemented to handle these data service specific issues. The storage allocation service interacts with this common bean 432 as appropriate to manage the overall storage allocation, via the DSV kernel layers 252 (FIG. 2.)

Bean 432 interacts with a data service volume management facade 416 that, in turn, connects to the CIM client 418. The management facade 416 provides a means by which the CIM client 418 can be accessed and managed as a Jiro™ service, i.e., a service that can be managed in a distributed environment from a remote host. The management facade 416 is essentially an object-oriented model of the CIM client 418 and provides a collection of APIs to manage the CIM client 418. Management facade 416 is also created and destroyed by management facade factory 428.

In addition, whenever changes are made in the configuration of the data services, both the DSV bean 432 and the SNDR bean 434 can inform a configuration manager bean 436 of the change in configuration information. SNDR bean 434 also retrieves configuration information from the configuration manager bean 436 under appropriate situations. The configuration manager bean 436 maintains a persistent view of the configuration of the data services. In this manner, if the system is interrupted during an operation, it can be restored to the proper state when the operation is resumed.

The presentation tier 400 is comprised of web-based GUIs running in a host 440 that could be any host that is connectable to the system via the Internet. The GUI 446 would generally be generated via a conventional web browser as discussed below. When the GUI 446 is invoked via the web browser, it uses the aforementioned Jiro™ lookup service to obtain a proxy 448 to a corresponding federated bean 434. The GUI 446 uses this proxy 448 to make method calls on the federated bean 434 to configure and control the data replication system. Alternatively, the GUI 446 may use the services of a webserver in a remote management server to locate and control the federated bean 434. This latter type of operation is described in more detail in connection with FIGS. 8, 12A, 12B and 13A–C.

The SNDR Federated bean 434 (SNDRBean) comprises an implementation 500 that is created by a constructor for a particular Jiro™ domain. When created, the SNDRBean 434 attempts to connect to an SNDRAdminMF interface in the data replication management facade 422.

Figure 5:
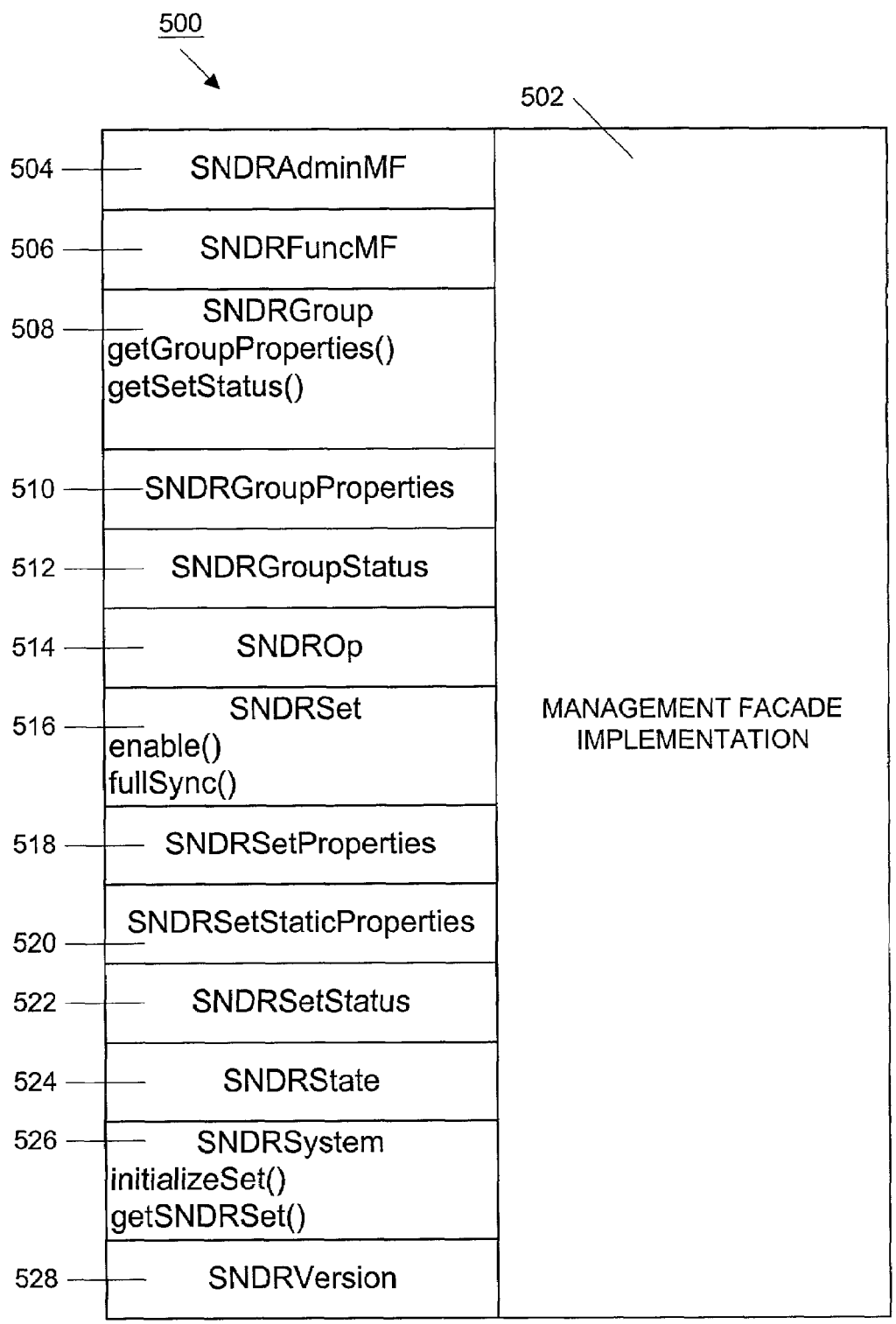
FIG. 5 is a more detailed schematic diagram of the management facade illustrating the interfaces exported by the management facade.

FIG. 5 illustrates, in schematic form, the interfaces 504–528 exported by a SNDR management facade 500. Facade 500 has a Jiro administrative interface that is defined by the SNDRAdminMF interface 504. Interface 504 provides APIs to do tracing, logging and polling for SNDR related activities. Facade 500 also has a functional interface defined by the SNDRFuncMF interface 406 that provides APIs to allow access to the SNDRSystem interface 526. The SNDRSystem interface 526 provides APIs to create and delete SNDRSets that are represented by the SNDRSet interface 516. If necessary, SNDRSets can be put together under a SNDRGroup represented by interface 508. Interface 526 also provides APIs to create and delete SNDRGroups and to obtain various SNDR specific information. These APIs include the initializeSet( ) method. In this method, the task of set initialization is delegated to an initializes method of an SNDRManagerImpl module or subprogram that implements the SNDRSystem interface. When the latter method is called, it performs several error checks. For example, the method checks the validity of the user-provided data. It also checks whether the resulting SNDR set will violate any constraints, etc. If all the checks are passed, then a new SNDRSet object is added to the list of the SNDR sets managed by the SNDRManagerImpl module. The SNDRSystem API also includes a getSNDRSet( ) method that returns a handle to an appropriate SNDRSet.

The SNDRGroup interface 508 provides APIs to add or remove a SNDRSet from the SNDRGroup, to lock or unlock a group, to modify group adjustable parameters, to apply operations like enable or disable, log, synchronize, etc. to the group as a whole. An instance of the SNDRGroupProperties interface 510 is created by the SNDRGroup method getGroupProperties( ). Similarly, an instance of the SNDRGroupStatus interface is created by the SNDRGroup method getSetStatus( ).

The SNDROp interface 514 defines the various operations that can be performed on a SNDRSet or SNDRGroup.

The SNDRSet interface 516 provides APIs to perform set-specific operations, such as enabling or disabling a SNDRSet, suspending or resuming a SNDRSet, logging and synchronizing a SNDRSet, etc. The API includes an enable( ) method that creates a set of objects in native interface (246 in FIG. 2) in order to communicate with the kernel routines. These native objects are populated with appropriate SNDR set information and SNDR data replication layer 254 is requested to enable an SNDR set with the information passed through the objects. The SNDR data replication layer 254 then enables the set by updating/creating new internal kernel data structures.

Interface 516 also includes a fullSync( ) method, which, when called, sets up necessary native interface objects for communication with the SNDR data replication layer in the kernel. The SNDR data replication layer is then requested to synchronize the primary and secondary volumes through these native interface objects and method calls. Once the synchronization is complete, the SNDR set goes into a replicating mode.

Interface 516 also has APIs to reconfigure SNDRSet properties, such as name, group to which the set belongs and other various adjustable properties. An instance of the SNDRSetProperties interface 518 is created by the SNDR-Set method getSetProperties( ). The SNDRSetStaticProperties interface 520 defines the SNDRSet parameters that cannot be changed for the lifetime of the SNDRSet. Similarly, an instance of the SNDRSetStatus interface 522 is created by the SNDRSet method getSNDRSetStatus( ).

The SNDRState interface 524 defines various states that a SNDRSet or SNDRGroup can be in. Finally, the SNDRVersion 528 defines the version of the data replication system.

Figure 6:
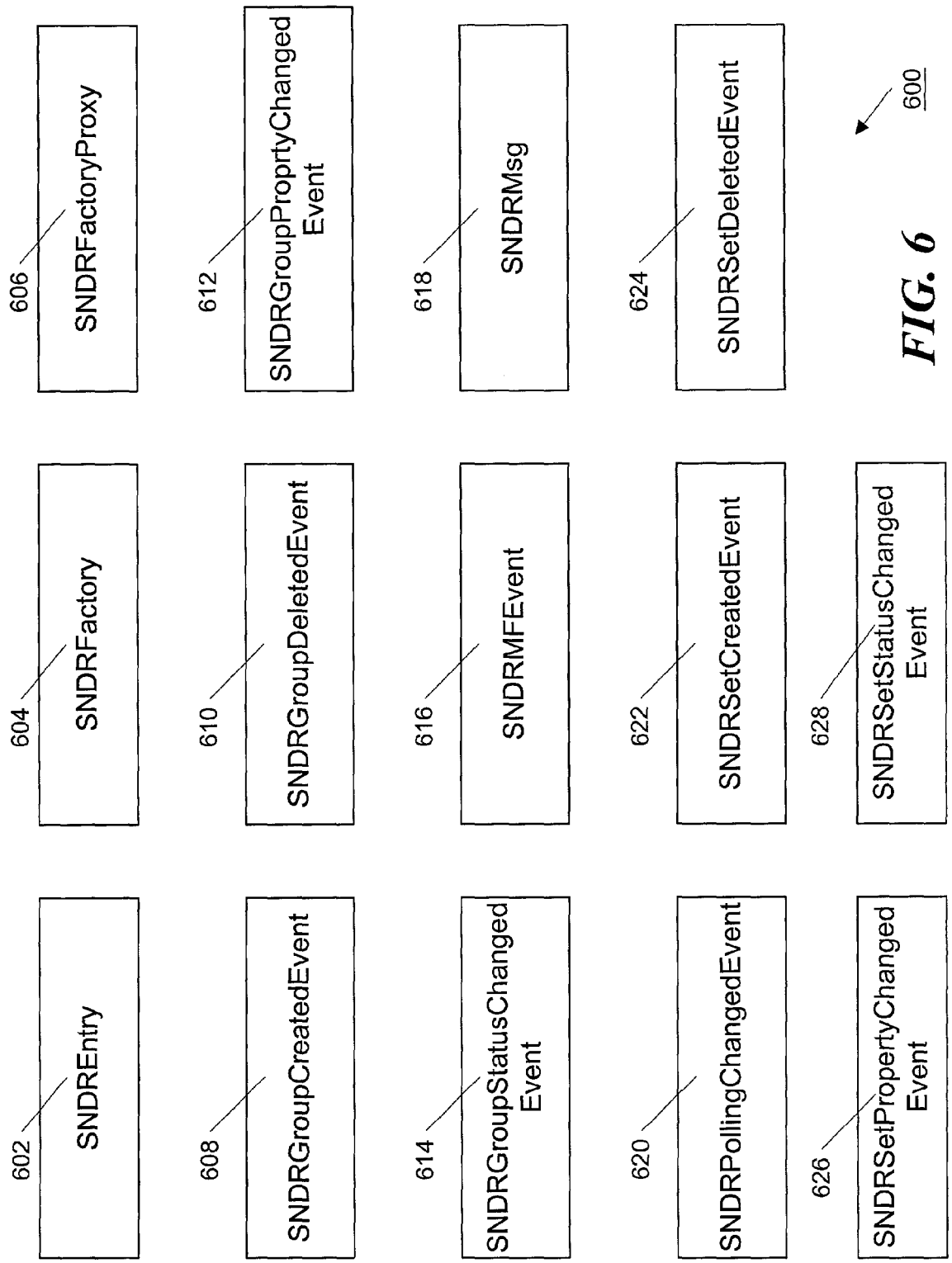
FIG. 6 is a schematic diagram illustrating the classes used to implement the management facade.

The SNDR management facade 500 automatically detects changes in the kernel information in the SNDR layer 254 via polling and fires various events using the Jiro™ event service when monitored changes occur. These events create an instance of an event object. A set of classes is used to construct the management facade implementation 502 shown in schematic form in FIG. 6. These classes include the SNDREntry class 602 that encapsulates lookup entries specific to the data replication system. Also included are the SNDRFactory class 604 and the SNDRFactoryProxy class 606. These latter classes provide life cycle services for the SNDR management facades. The SNDRMsg class provides an anchor point for SNDR service logging and tracing.

Management facade 500 logs errors using the log service provided by the Jiro™ framework. It also fires events when interesting changes occur in SNDR system. A number of classes are used to encapsulate these events. These classes include the SNDRMFEvent class 616, which is an abstract event class that acts as a root for all SNDR management facade events.

The SNDRGroupCreatedEvent 608 creates an event object that is posted whenever a new SNDRGroup is created and the SNDRGroupDeletedEvent 610 creates an object that is posted whenever an SNDRGroup is deleted. The SNDRGroupPropertyChangedEvent 612 and the SNDRGroupStatusChangedEvent 614 are created and posted when one or more SNDRGroupProperties have changed or when the SNDRGroupStatus has changed for an SNDRGroup.

Similarly, the SNDRSetCreatedEvent 622 creates an object that is posted whenever a new SNDRSet is created and the SNDRSetDeletedEvent 624 creates an object that is posted whenever an SNDRSet is deleted. The SNDRSetPropertyChangedEvent 626 and the SNDRSetStatusChangedEvent 628 are created and posted when one or more SNDRSetProperties have changed or when the SNDRSetStatus has changed for an SNDRSet.

The Jiro™ framework scheduling service is also used to start and stop polling as well as for changing the polling interval as needed. The SNDRPollingChangedEvent 620 is posted whenever management facade polling is started or stopped or the polling interval is changed.

Figure 7:
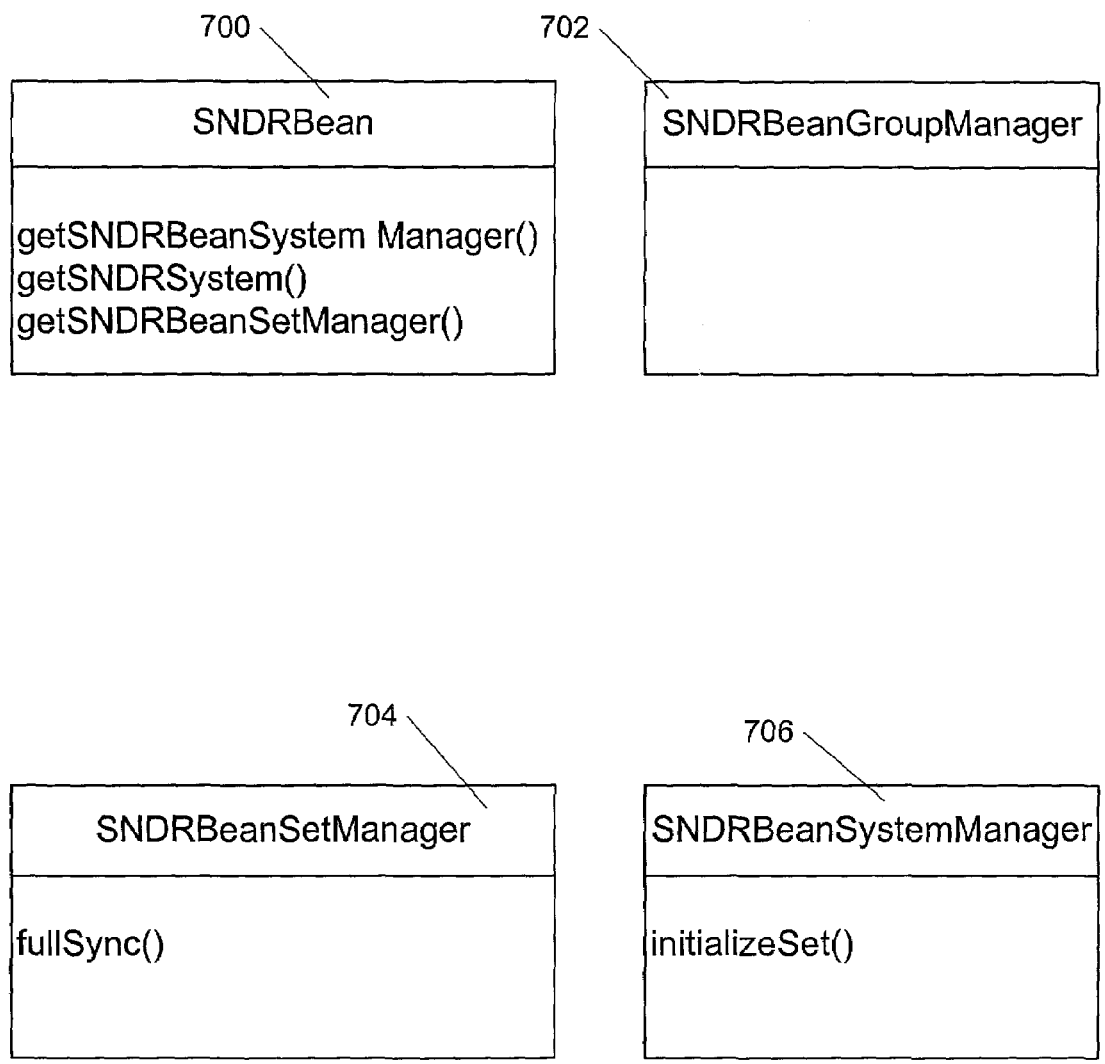
FIG. 7 is a schematic diagram of the interfaces exported by an SNDR federated bean.

The interfaces exported by the SNDR federated bean are illustrated in FIG. 7. These include the SNDRBean interface 700 that defines the SNDR federated bean and the SNDRBeanGroupManager 702 that provides a representation of an SNDR group. Also included are the SNDRBeanSetManager 704 that provides a representation of an SNDR set and the SNDRBeanSystemManager 706 that defines the system interface for an SNDR bean.

The SNDRBean interface 700 includes has number of methods that are used to manage the system. These methods include the getSNDRBeanSystemManager( ) method that retrieves a handle to a SNDRBeanSystemManager object that manages the overall SNDRSystem and provides APIs to create SNDR sets. The getSNDRSystem( ) method can be used to contact the SNDR management facade (422, FIG. 4) in order to retrieve an SNDRSystem object that the management facade is using as the manager of individual SNDR sets and groups.

A getSNDRBeanSetManager( ) method can be called to retrieve an SNDRBeanSetManager object which manages operations pertaining to individual SNDR sets. The interface 704 of the SNDRBeanSetManager object includes a fullSync( ) method which, as described below can be used to synchronize volumes in the appropriate SNDRSet.

An SNDR federated bean may illustratively be controlled by a graphic user interface. As previously mentioned, in one embodiment, the presentation tier 400 is implemented by a web-based GUI. In this embodiment, the web-based GUI for the data imaging management service is based on a framework called the "Struts" framework. The Struts framework is an open source framework useful in building web applications with Java Servlet and JavaServer Pages (JSP) technology. The framework is designed to encourage application architectures based on a Model-View-Controller (MVC) design paradigm. The framework includes, as primary areas of functionality, a controller servlet that dispatches requests to appropriate "Action" classes provided by an application developer, JSP custom tag libraries, and associated support in the controller servlet, that assists developers in creating interactive form-based applications and utility classes to support XML parsing, automatic population of JavaBeans properties based on the Java reflection APIs, and internationalization of prompts and messages. The Struts framework is being developed as part of the Jakarta Project, sponsored by the Apache Software Foundation, 1901 Munsey Drive, Forest Hill, Md. 21050-2747. Complete details of the Struts framework can be found at website jakarta.apache.org/struts.

Figure 8:
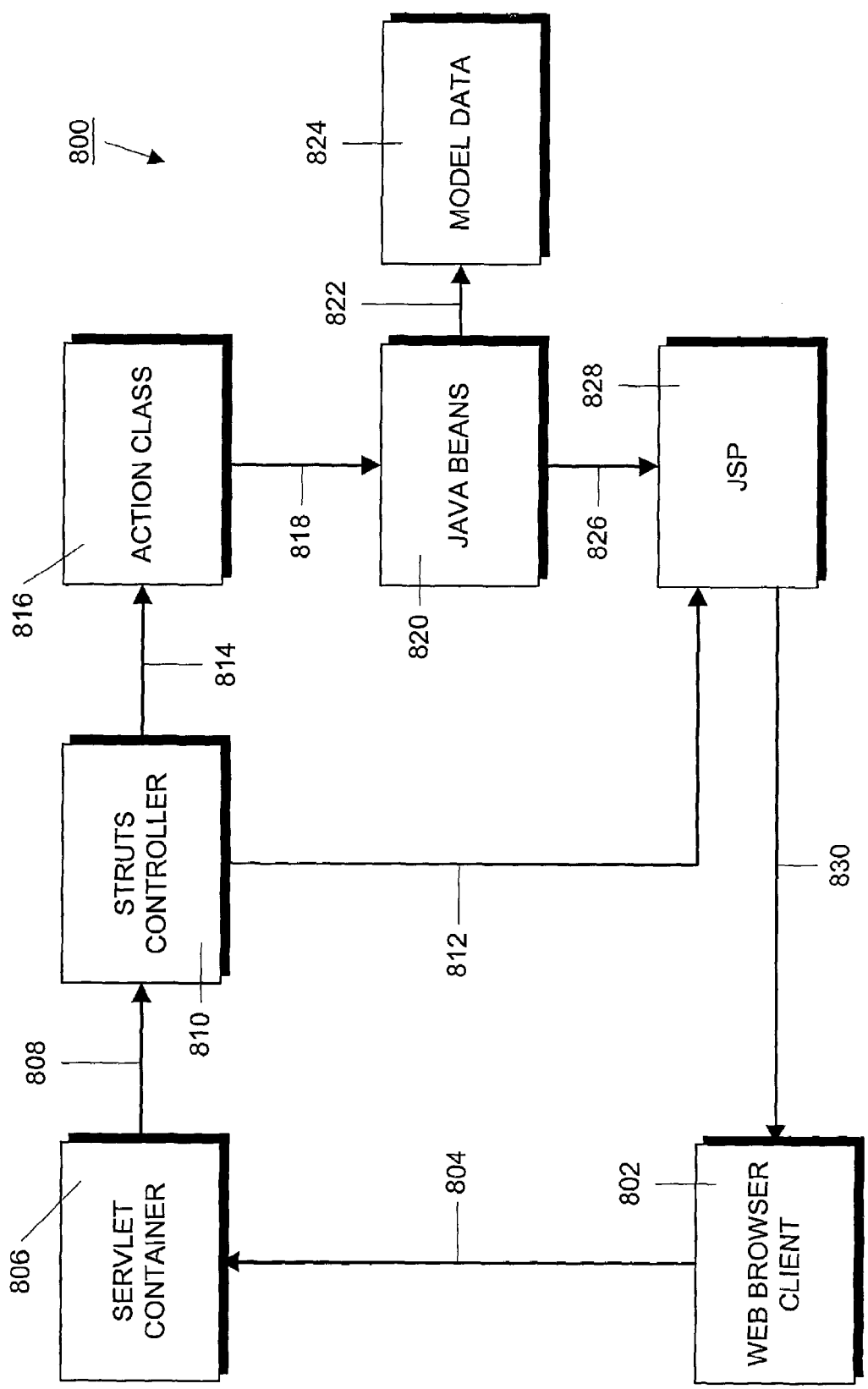
FIG. 8 FIG. 8 is a block schematic diagram of a presentation system as implemented using a Struts framework.

FIG. 8 illustrates the overall architecture of the user interface framework 800 used in the illustrative embodiment and based on the Struts framework. The user interacts with a client interface that, in turn, uses the well-known Hypertext Transfer Protocol (HTTP) protocol to communicate with the rest of the system. In one embodiment, the client could be a web browser, such as web browser 802. In other embodiments, the client could be a corresponding command line interface (not shown in FIG. 8.)

For example, the client could be implemented as a form written in HTML which can be displayed in web browser 802 and accept input. Forms for controlling a data replication service might include a form directed to manipulating SNDRSets (see FIG. 10, below.) This form could accept as input, two host names, two volume names, two bitmap volumes, and options to begin an operation. The form then offers options to enable the primary side, the secondary side, or both sides, of the pair. Similarly, an HTML form for manipulating SNDRGroups could accept as input, a group name, multiple set names, and options to enable the group after creation (see FIG. 11.)

Information retrieved via the client 802 is sent, as indicated by arrow 804, to the servlet container 806 to be processed. The servlet container 806 would normally be container within a web server (not shown in FIG. 8.) Web server software suitable for use with the present invention is Tomcat web server software available from the aforementioned Apache Software Foundation.

Servlets are programs that run within the web server and process requests from an HTTP client. The servlet container that is bundled with the Tomcat web server supports all servlet activity. In this architecture, the servlet container provides the appropriate libraries to process requests. For a data replication service required libraries include the Jiro™ Federated Bean, Management Facade, and related Jiro and CIM libraries. Once the necessary resources are confirmed, the servlet container passes control to the struts controller 810.

The Struts controller 810 bundles and routes HTTP requests to other objects in the framework. It is responsible for the flow of control and maps requests to the appropriate handlers. The controller 810 creates one instance of an Action class, such as class 816, and uses this instance for all requests. Specifically, for the data replication system, if the Struts controller 810 can make a successful mapping to an appropriate handler, it will forward to the path name "/SNDRJiro" to the handler, otherwise it will record a failure and send the error results to the Java Server Pages 828 to be displayed as described below and as indicated schematically by arrow 812.

Action class 816 receives a request from the Struts controller 810 and interprets information in the request. Class 816 then instantiates an appropriate Java Bean with the given information as schematically illustrated by arrow 818. After locating the bean and completing some task, class 816 can also forward the request to another action class (not shown in FIG. 8.) In a data replication system, the Action class 816 is a DoConnectSNDRJiroBean class. This class parses and interprets information in a client request, such as the host, volume, and bitmap names that were submitted by the client. Once the parsing is complete, the DoConnectSNDRJiroBean class instantiates the aforementioned SNDRBean with the appropriate input and begins to call the bean methods as necessary. This latter action is indicated schematically by arrow 818

Usually, the Java Beans, such as the SNDRBean use a form of Java Remote Method Invocation (RMI) to retrieve their data. The model data 824 for this prototype lies in CIM provider objects and Jiro Management Facades. The model data 824 that the SNDRBean retrieves is sent to the Java Server Pages 828 to be displayed as indicated by arrow 826. In addition, the Java Server Pages 828 can send requests to the Java beans for particular information to display. In the data replication system, the SNDRBean acts as a wrapper to the data model 824. The SNDRBean does a lookup of the data model components, that is the management facade or the CIM client, using the Jiro lookup service. Once a proxy to these remote objects is received, real time data from the model data 824 can be retrieved by calling methods on the SNDRBean.

A Java Server Page 828 is used to incorporate dynamic data into an HTML page. The JSP 828 gets its data from the Java Beans 820 and therefore separates the processing of data from the representation of the data. The JSP 820 then sends its information back to the client browser for display as indicated by arrow 830. In the data replication system, the JSP 828 creates a reference to the existing instance of SNDRBean and begins to call the methods on the bean. The information that the bean returns is formatted and displayed to the client by the JSP 828.

Figure 9:
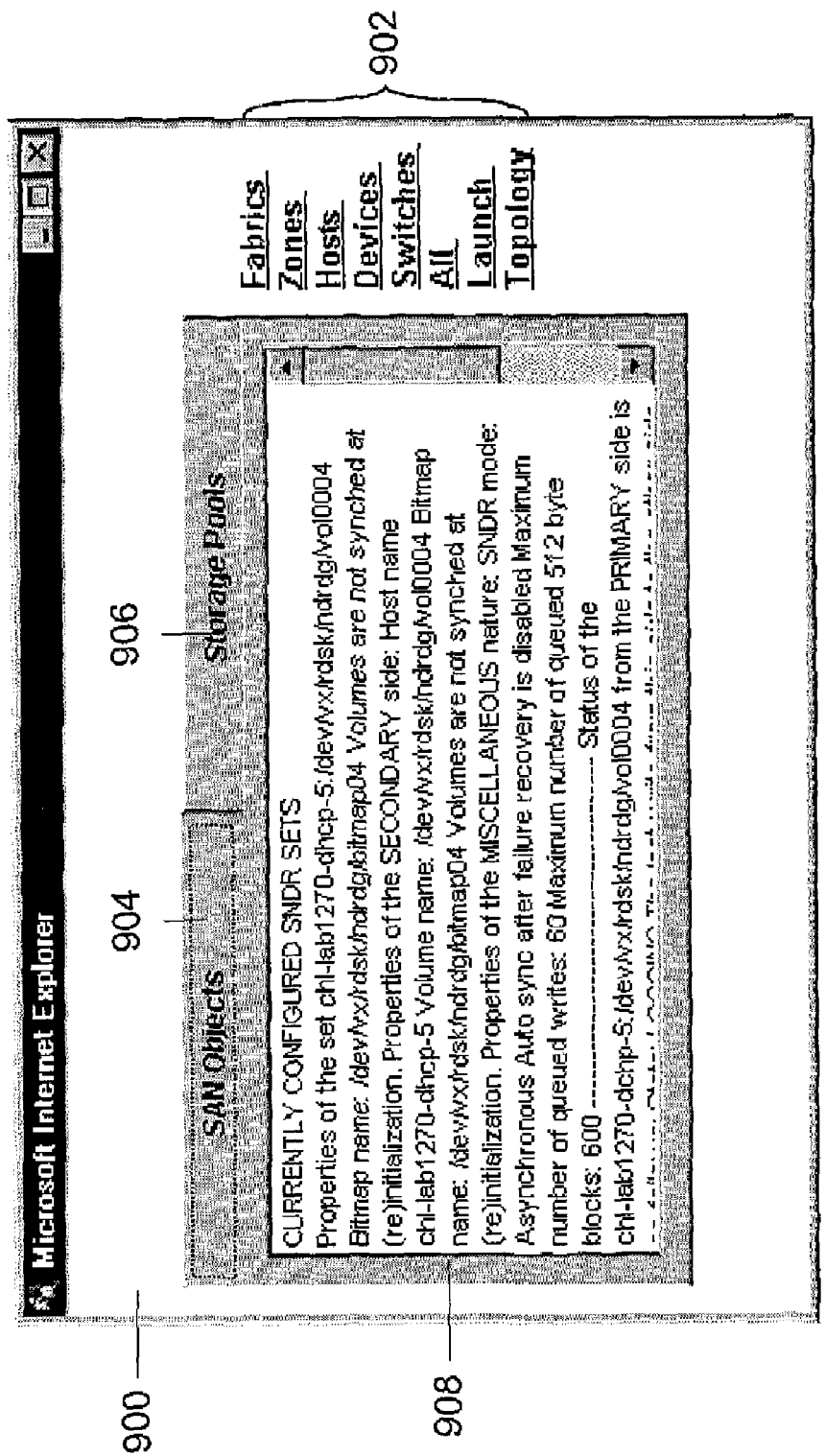
FIG. 9 is a screen shot of a screen generated by a management GUI that allows a user to view SNDRSets and SNDRGroups and their present status
Figure 10:
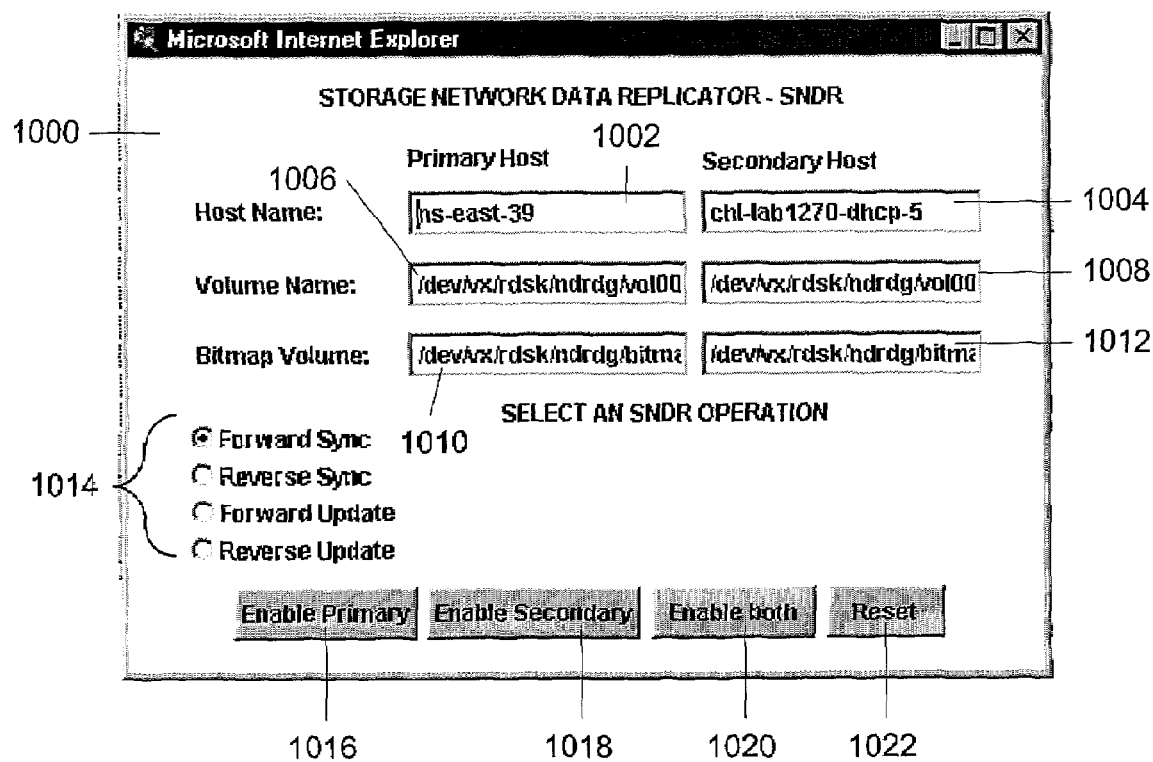
FIG. 10 is a screen shot of a screen generated by a management GUI that allows a user to enter information that is required to configure an SNDR set.
Figure 11:
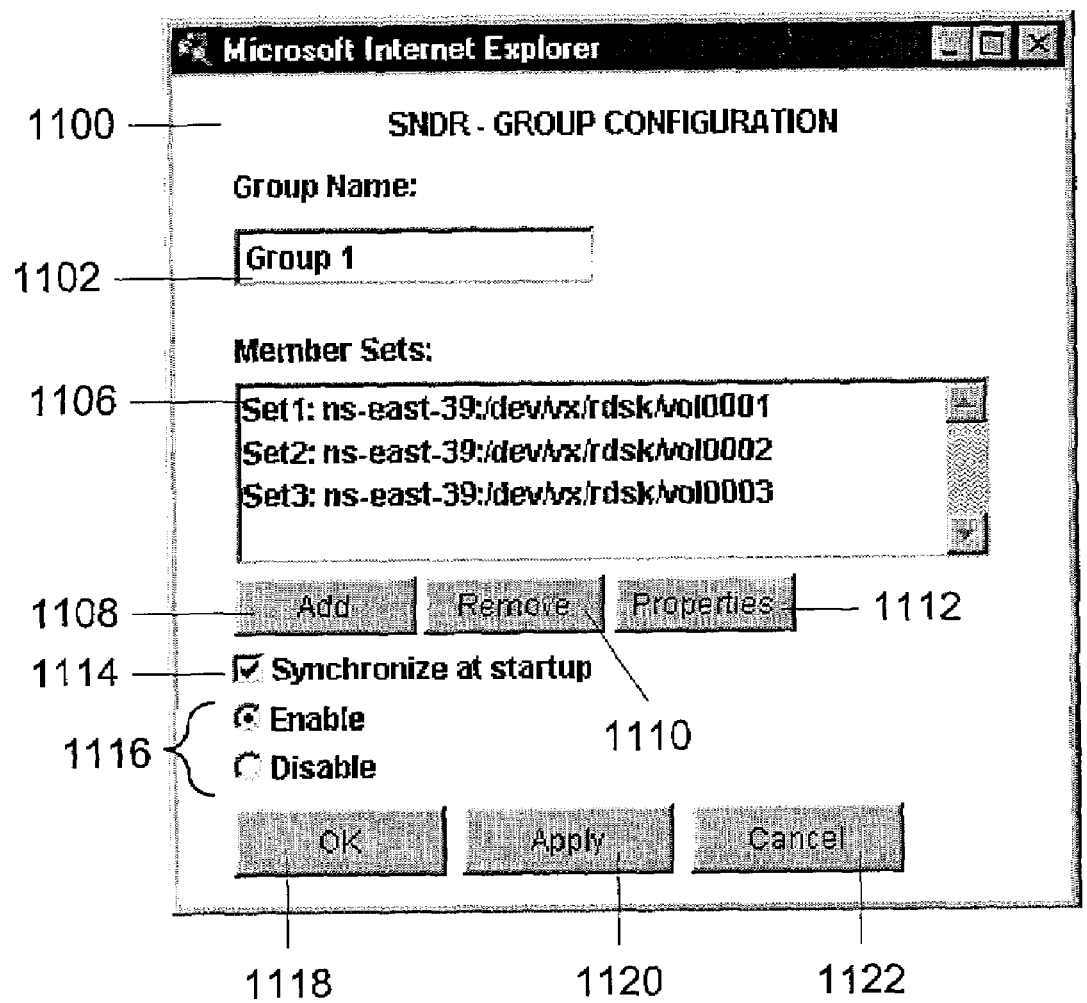
FIG. 11 is a screen shot of a screen generated by a management GUI that displays the configuration of an SNDR group.

FIGS. 9–11 are screen shots illustrating screen displays that comprise an illustrative GUI used to control the federated bean. FIG. 9 illustrates the main screen of the SNDR GUI as generated by an HTML form. The main screen is generated on a web browser 900 and contains a list of element sets 902, one of which can be selected in order to display details of the elements in the set. FIG. 9 depicts the screen display when the "Devices" element set is selected.

The display includes a two-tab page display that, for the "devices" element set, includes a "SAN objects" tab 904 and a "Storage Pools" tab 906. FIG. 9 illustrates the display when the "SAN objects" tab 904 is selected. The SAN objects page includes a scrolling list 908 that display details of the currently configured SNDR sets. These details include the primary and secondary host, volume and bitmap volume names, the operational modes and various statistics concerning the operational status.

FIG. 10 is a screen shot of an illustrative screen display 1000 generated by an HTML form that could be used with the data replication system of the present invention. This form includes information for viewing and controlling data replication volume sets. It includes text boxes for entering and modifying the host name for the primary and secondary hosts 1002 and 1004, respectively. It also includes text boxes for entering and modifying the pathname 1006 of the primary volume and for entering the pathname 1008 of the secondary volume. Text boxes are further provided for entering the pathname 1010 of the primary bitmap volume of the set and the secondary bitmap volume 1012.

A set of option buttons 1014 is provided for selecting the operational mode of the set including forward or reverse sync mode and forward or reverse update mode.

Command buttons are also provided for enabling the primary volume (1016), enabling the secondary volume (1018), enabling both the primary and the secondary volumes (1020) and resetting the system (1022.)

FIG. 11 is a screen shot of an illustrative screen display 1100 generated by an HTML form that could be used with the data replication system of the present invention. This form includes information for viewing and controlling data replication volume groups. It includes a text box 1102 for entering a name for the SNDRGroup. A list box 1106 is provided for displaying each SNDRSet in the group.

Command buttons are provided to add 1108, remove 1110 and change the properties 1112 of a set selected in the list box 1106. Selecting one of these buttons, 1108–1112, would typically open additional dialog boxes (not shown) as appropriate. A check box 1114 is provided to synchronize the selected set on startup and option buttons 1116 are also provided to enable or disable the selected SNDRSet.

Information for a new SNDRGroup can be entered into the appropriate text boxes, check boxes and option buttons and then saved by selecting the "OK" command button 1118. Alternatively, information displayed on the form can be modified and the modifications saved by selecting the "Apply" command button 1120. Any new information or changes can be canceled by selecting the "Cancel" command button 1122.

Figure 12:
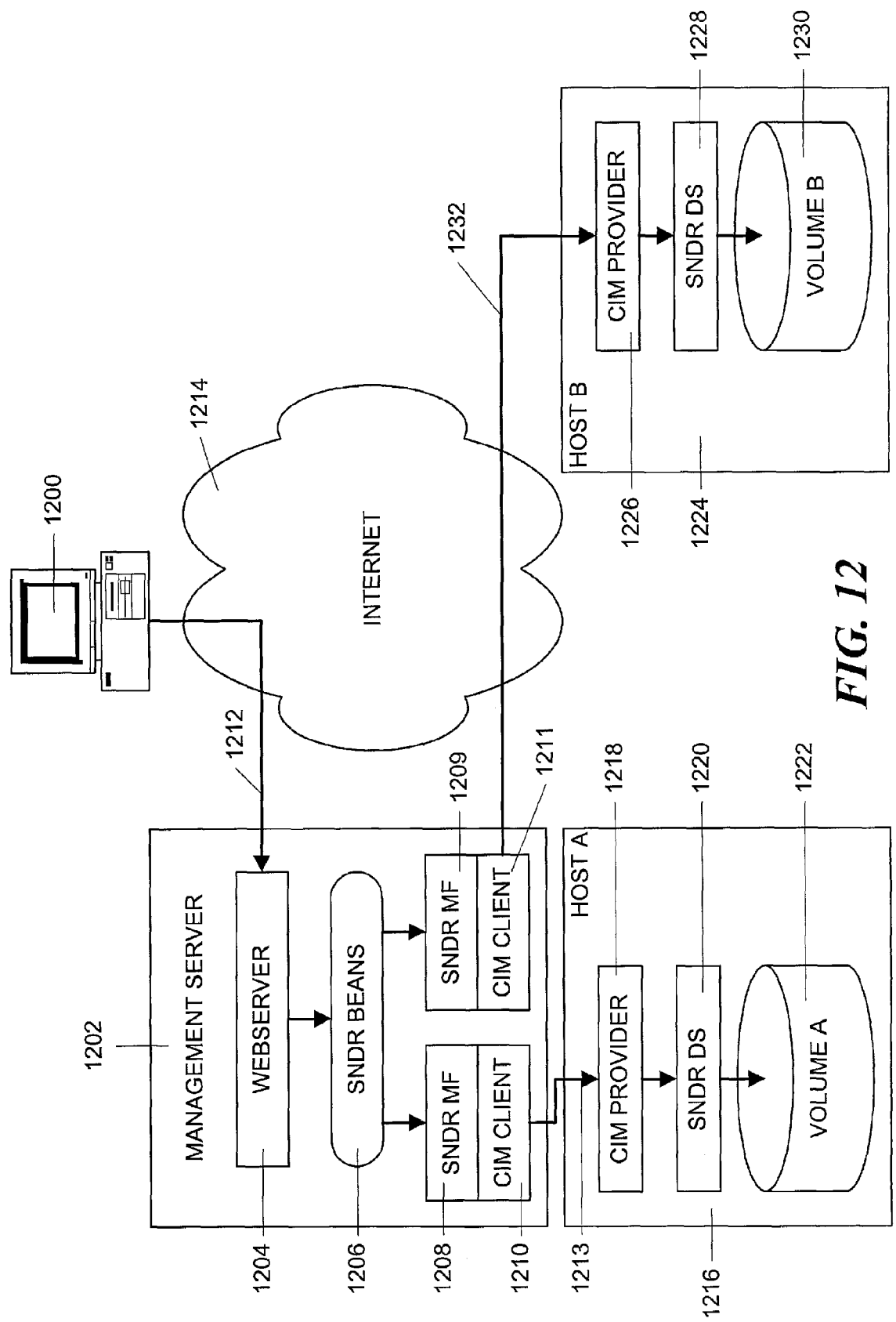
FIG. 12 is a schematic block diagram illustrating the implementation of a simple data replication system using the principles of the present invention.
Figure 13A:
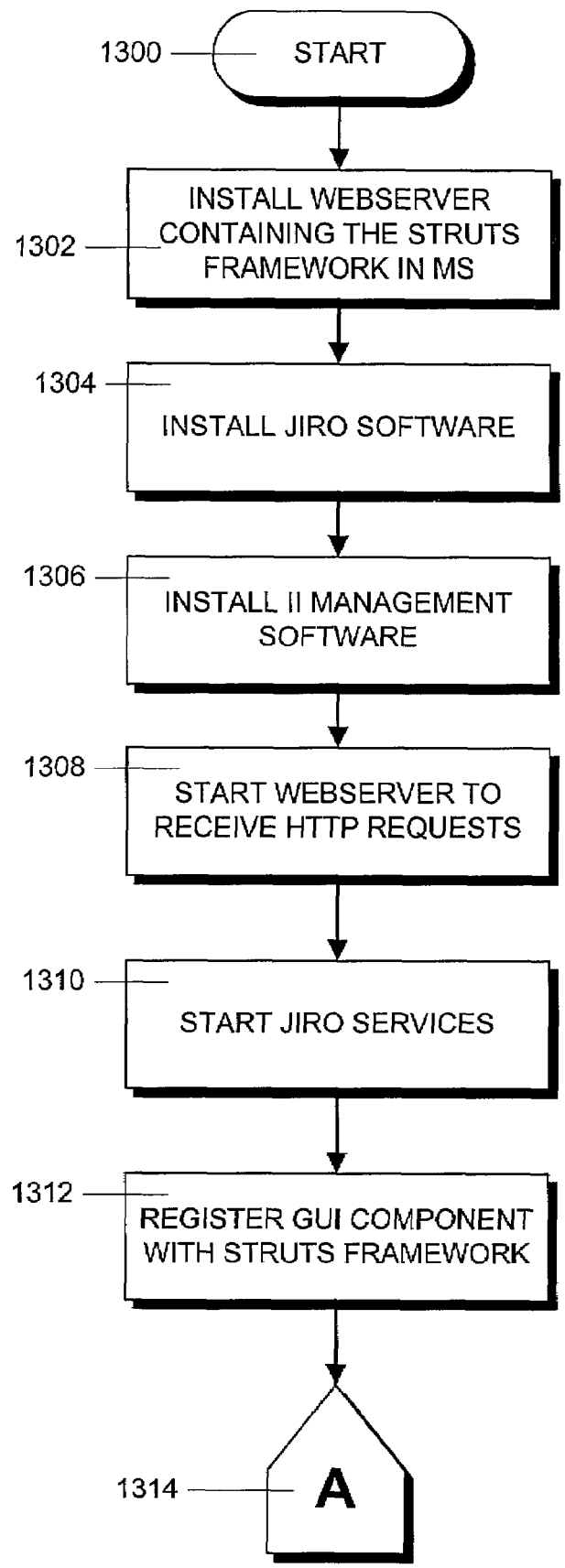
FIG. 13 is a flowchart showing the steps of an illustrative process for installing data replication software in the system of FIG. 12.
Figure 13B:
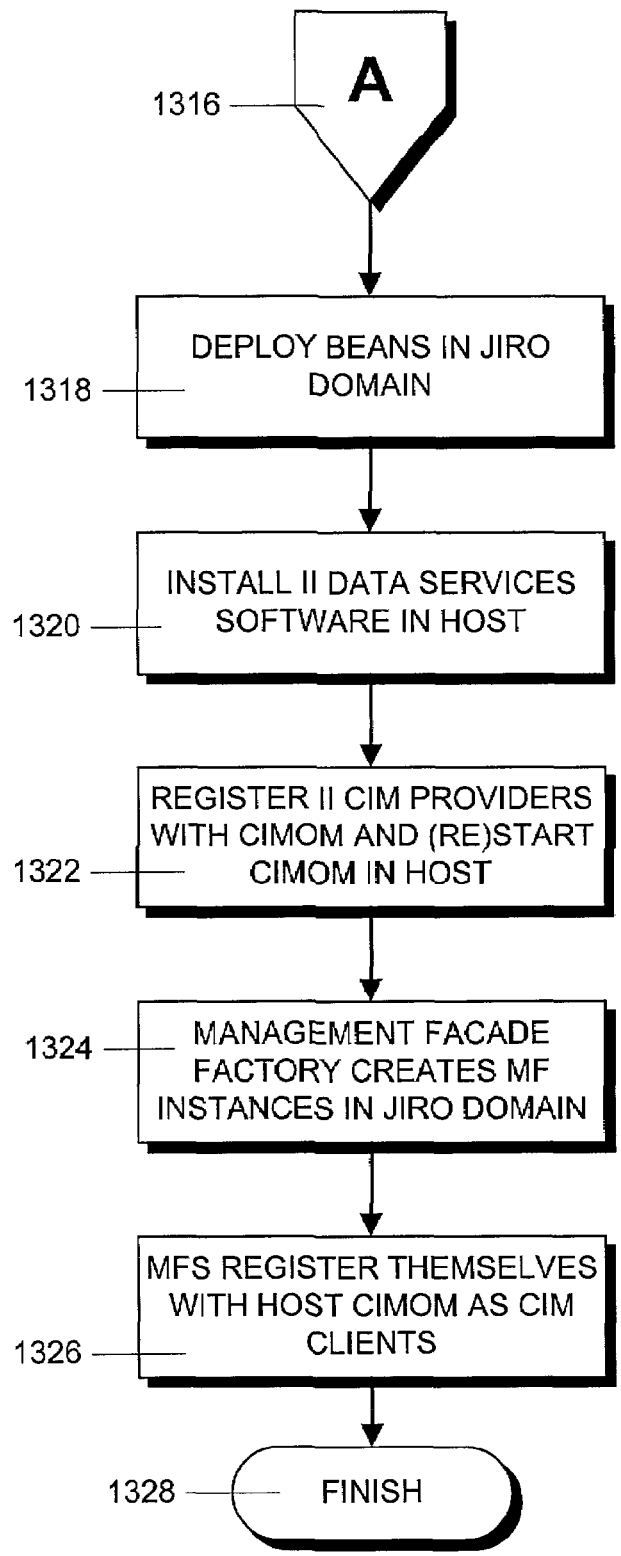
Figure 14A:
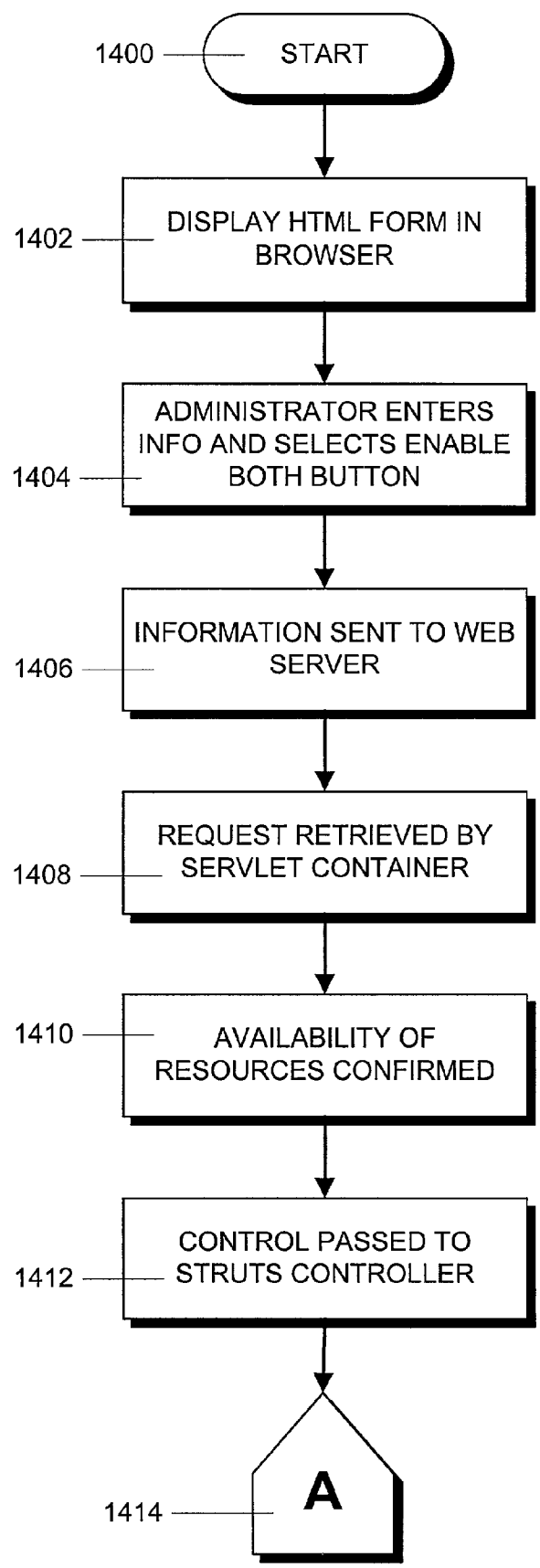
FIGS. 14A–14D, when placed together, form a flowchart showing the steps of an illustrative process for creating and enabling volume sets for the data replication system of FIG. 12.
Figure 14B:
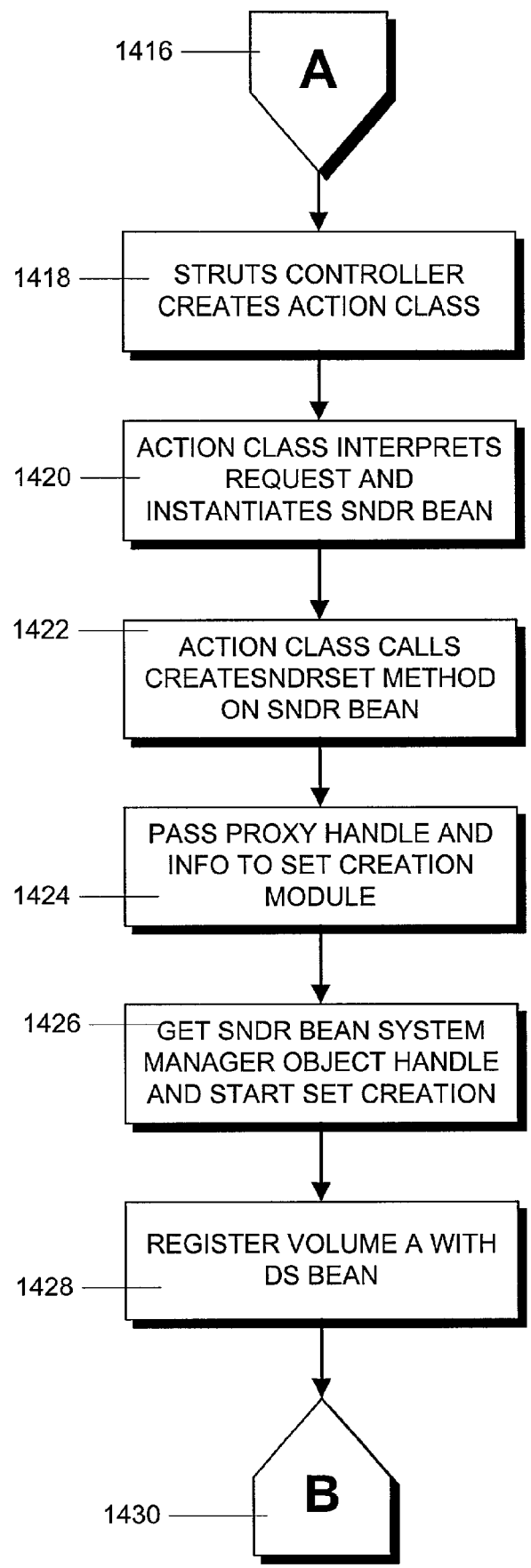
Figure 14C:
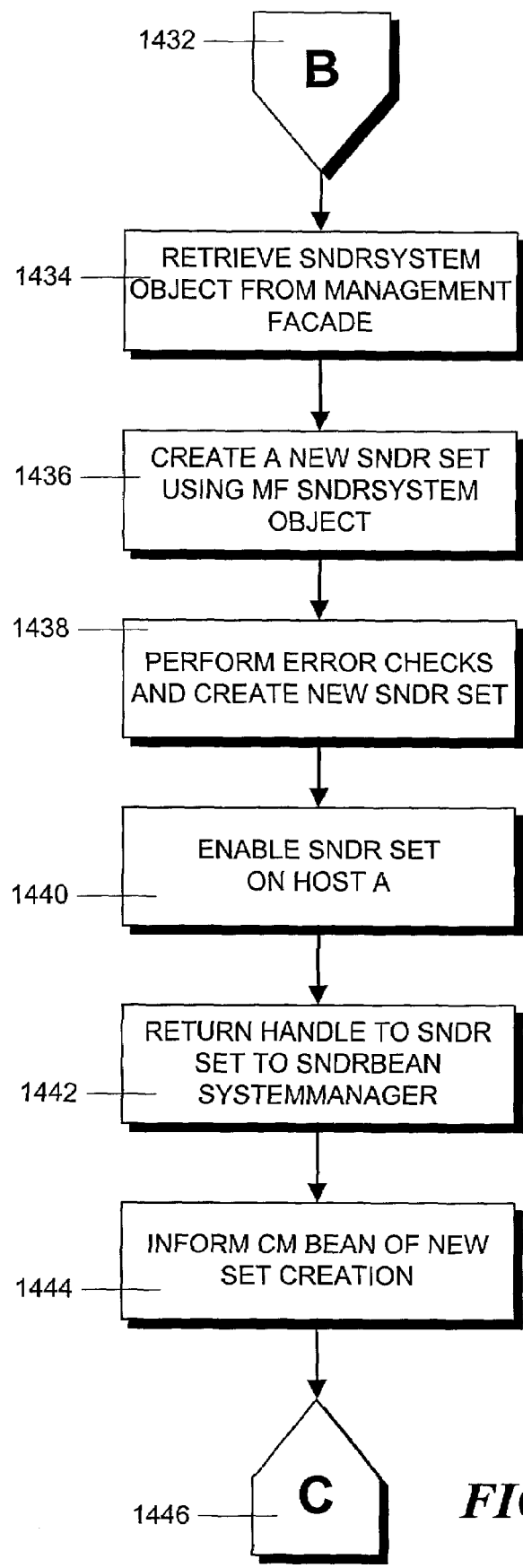
Figure 14D:
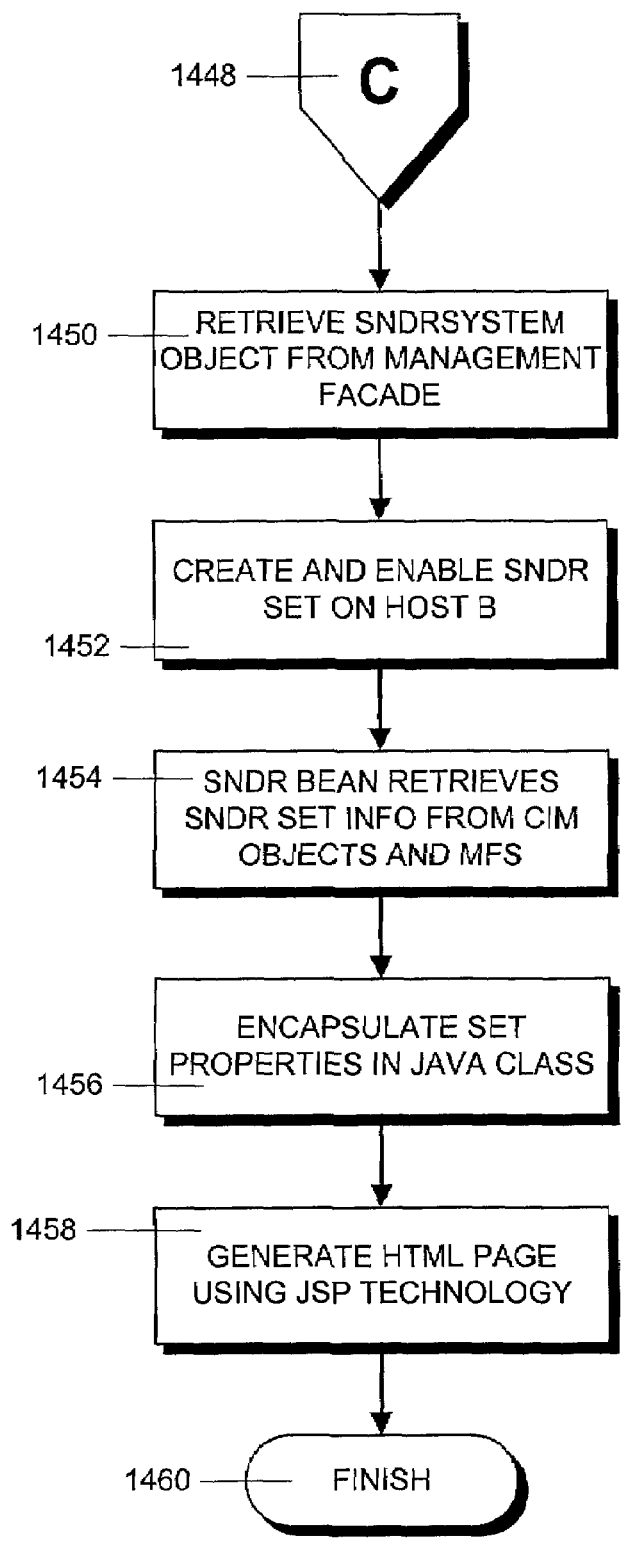

An example data replication setup is illustrated in FIG. 12. FIGS. 13A and 13B illustrate the steps performed in initially configuring the system. FIGS. 14A–14D show a flowchart illustrating the steps carried out by the inventive data replication system to set up the configuration shown in FIG. 12 and to remotely replicate data from volume A (1222) of host system A (1216) located in geographic region I to volume B (1230) of host system B (1224) located in a different geographic region II using the inventive SNDR management services software, via network 1214.

In order to use the inventive system, the software that is required must first be installed in the system, including the management server system 1302, the host A system 1216 and the host B system 1224. Note that in FIG. 12, the management server system 1202 is illustrated as a different system from the host systems 1216 and 1224. However, the inventive data replication system can also operate with a configuration in which the management server and one of the hosts are on the same computer system. The steps of the installation process are shown in FIGS. 13A and 13B. The installation process begins in step 1300 and proceeds to step 1302 where a webserver 1204 containing the STRUTS framework (if that framework is to be used to process the request) is installed in the management server 1202 and, in step 1304, the Jiro™ software is installed in the management server 1202. The installation process for this software is explained in detail in the aforementioned Jiro SDK.

In step 1306, the SNDR management software is installed in the management server system 1302. This software includes the management facade factory 428 (FIG. 4) and the federated beans 1206 (comprising the SNDRBean 434 and other beans that are necessary, such as the DSV bean 432 and the configuration manager bean 436).

In step 1308, the webserver 1204 is started so that it can receive http requests via the Internet 1214 from a GUI component, such as a web browser, in terminal 1200 as indicated schematically by arrow 1212. In step 1310, the Jiro services software is started and, in step 1312, the GUI component in terminal 1200 is registered with the STRUTS framework in the webserver 1204.

The installation routine then proceeds, via off-page connectors 1314 and 1316, to step 1318. In step 1318, the data replication bean and other federated beans are deployed in the Jiro domain.

Next, the data services software used for data replication is installed on both of the host systems 1216 and 1224. This software 1220 includes the data service layer software 252 (FIG. 2), the SNDR layer 254 and the native interfaces, 242 and 246. Other layers, such as a data-caching layer can also be included in this installation process. In general, the CIM object manager instance 230 would be part of the operating system on the host and would not need to be separately installed. The managed object format files that are used to create the CIM providers would also have been previously installed.

In order to create instances of the CIM providers 1218 and 1226, the MOF files must be registered with the respective CIMOMs. This is shown in step 1322 where the MOF files are registered with the CIMOMs (not shown in FIG. 12) in the hosts 1216 and 1224 and the CIMOMs are restarted, if they are already running, or started, if they are not already running. When the CIMOMs are restarted, they create instances of the required CIM providers in accordance with the MOF files as previously described. During this process, appropriate creation events are generated by the CIMOMs.

In response to the creation events generated by the CIMOMs, the management facade factory 428 creates instances on the corresponding management facades 1208 and 1209 in the appropriate Jiro™ domain as set forth in step 1324.

Next, in step 1326, the management facades register themselves with each host CIMOM as CIM clients 1210 and 1211. The process then finishes in step 1328.

After the installation and deployment steps are complete in both host A 1216 and host B 1224, the process of configuring the system can begin. The steps involved in this process are illustrated in FIGS. 14A–14D. During this process, the system manager at terminal 1200 uses the SNDR GUI to send information to the web server in order to create an action class that causes an SNDR set in both host A 1216 and host B 1224 to be created and enabled. The action class then synchronizes volume B 1230 (the secondary volume) with volume A 1222 (the primary volume). Once the synchronization is complete, the SNDR set will be in REPLICATING mode. From that time, all the input/output information sent to volume A 1222 will automatically be replicated to volume B 1230, and the content of both the volumes will be the same (that is, "mirrored").

The configuration process begins in step 1400 and proceeds to step 1402 where a web browser running in terminal 1200 displays an HTML form that accepts the parameters necessary to create two SNDR volume sets. Such an HTML form might look like the form shown in FIG. 10. This form includes a text field for each of the two host names (1002 and 1004) and a text field for their corresponding volumes (1006, 1008) and bitmap volumes (1010 and 1012.) Options for enabling a primary and/or secondary volume set are exported via a button widget comprising buttons 1016–1022, while the options for a forward or reverse sync, or update, are exported via an option button widget 1014. In step 1404, an administrator enters the required information, selects the appropriate action from option buttons 1014 and select the "Enable Both" button 1020.

In step 1406, the information submitted via the HTML form is sent to the web server 1204 as a create request and, in step 1408, the request is retrieved by a servlet container (806, FIG. 8) which runs within the web server 1204. In step 1410, the servlet container 806 confirms that resources necessary to run the application are available. These resources include an SNDR Jiro™ Federated Bean, an SNDR Management Facade, and other Jiro™ and CIM related libraries. Once the necessary resources are confirmed, the servlet container 806 passes control to a STRUTS controller 810 in step 1412. The process then proceeds, via off-page connectors 1414 and 1416 to step 1418.

The controller 810 bundles and routes HTTP requests to other objects in the framework illustrated in FIG. 8. It is responsible for the flow of control and maps requests to appropriate handlers. In step 1418, controller 810 creates one instance of an action class 816 and uses it for all requests. In this example, controller 810 creates an instance (DoConnectSNDRJiroBean) of an SNDRConnectionAction class in step 1418. Specifically, for creating an SNDR set, when the struts controller 810 can make a successful mapping to an appropriate handler, it will forward the request to the path name "/SNDRJiro", otherwise the controller will record a failure and send the error results to the JSP 828.

The DoConnectSNDRJiroBean class 816 receives requests from the controller 810 and interprets information in the request as set forth in step 1420. Specifically, the DoConnectSNDRJiroBean parses the request into key/value pairs. For example, assume the administrator submits the following values for the primary and secondary host, volume and bitmap volume names:

| host names: | ns-east-39 | chl-lab1270-dhcp-5 |
|---|---|---|
| volume names: | /deve/vx/rdsk/ndrdg/vol1 | /deve/vx/rdsk/ndrdg/vol3 |
| bitmap names: | /deve/vx/rdsk/ndrdg/vol2 | /deve/vx/rdsk/ndrdg/vol4 | the DoConnectSNDRJiroBean action class will assign these values to appropriate keys as follows:

| | |
|---|---|
| server1 = | ns-east-39 |
| server1Vol = | /deve/vx/rdsk/ndrdg/vol1 |
| server1Bit = | /deve/vx/rdsk/ndrdg/vol2 |
| server2 = | chl-lab1270-dhcp-5 |
| server2Vol = | /deve/vx/rdsk/ndrdg/vol3 |
| server2Bit = | /deve/vx/rdsk/ndrdg/vol4 |

The DoConnectSNDRJiroBean action class 816 then instantiates an SNDR JiroBean with the given information and receives a proxy handle to the bean. The DoConnectSNDRJiroBean action class 816 uses the information gathered from the request and calls the methods on the SNDRJiroBean as necessary using the proxy handle. After instantiating the bean and completing some task, the DoConnectSNDRJiroBean action class can also forward information to another action class.

Federated Jiro™ Beans contain the substance of the architecture. Once the SNDRJiroBean is instantiated by the action class, it will provide the business logic and model data that enriches the program. The bean exposes a set of methods that will use the data initially submitted by the administrator. In creating the SNDR set given the primary and secondary host, volume and bitmap names above, the DoConnectSNDRJiroBean action class would call the createSNDRSetStaticProperties(primaryVolName, primaryHostName, primaryBitMap, secondaryVolName, secondaryHostName, secondaryBitMap) method of the SNDRBean as set forth in step 1422. The parameters in this method are filled with the data mapped above in step 1420.

Next, in step 1424, the DoConnectSNDRJiroBean action class forwards the proxy handle of the SNDRJiroBean and the other method parameters in the SNDR set creation method to a SNDR GUI set module or subprogram (realized by a Java class) that performs the rest of the specialized steps involved for SNDR set creation.

In step 1426, the SNDR GUI set creation module then calls the getSNDRBeanSystemManager( ) method on the SNDR federated bean proxy handle to retrieve a handle to the SNDRBeanSystemManager object which manages the overall SNDRSystem and provides APIs to create SNDR sets. The SNDR GUI set creation module then informs the SNDRBeanSystemManager of its intention to create a SNDR set using the user-provided parameters for different components of the SNDR set by calling the initializeSet( ) method of the SNDRBeanSystemManager( ) object with appropriate arguments.

In the initializeSet( ) method, in step 1428, the SNDRBeanSystemManager informs a data services federated bean (not shown in FIG. 12) running on host A 1216 about volume A 1222 in this host that the SNDR federated bean 1206 is going to use. The SNDRBeanSystemManager does that by calling a registerSVIVolume( ) method of the data services federated bean with appropriate volume names as arguments in order to register the volumes with the data services federated bean.

The process then proceeds, via off-page connectors 1430 and 1432 to step 1434 where, the SNDRBeanSystemManager object calls the getSNDRSystem( ) method of SNDR bean 1206. Inside the getSNDRSystem( ) method, SNDR bean 1206 contacts the SNDR management facade 1208, retrieves a handle to the SNDRSystem object that the management facade 1208 is using as the manager of individual SNDR sets and groups, and returns the handle to the SNDRBeanSystemManager object.

Once the SNDRBeanSystemManager object gets the SNDRSystem handle from the management facade layer 1208, in step 1436, it asks the SNDRSystem object to create a SNDR set with the user provided data by calling the initializeSet( ) method of the SNDRSystem object. This latter method call is at the management facade layer 1208 and, in the initializeSet( ) method, the task of set initialization gets delegated to another initializes method of the SNDRManagerImpl, a module/subprogram implements the management facade SNDRSystem.

In step 1438, the SNDRManagerImpl initializes method first performs several error checks. For example, it checks for the validity of the user provided data and whether the resulting SNDR set will violate any constraints, etc. If all the checks are passed, then a new SNDRSet object is created and added to the list of the SNDR sets managed by this SNDRManagerImpl. At this stage, the newly created SNDR set is in DISABLED state and the kernel does not yet know of this set.

In step 1440, the SNDRManagerImpl object calls the enable( ) method of this newly-created SNDR set. In this enable( ) method, a set of native interface objects are created to communicate with the host A kernel. These native interface objects are populated with the appropriate SNDR set information and SNDR data services layer 1220 is requested to enable a SNDR set with the information passed through these native objects. The data services kernel layer 1220 then enables the set by updating/creating new internal kernel data structures. The enabled set goes into LOGGING mode immediately as host B might, or might not, be ready. (In the situation described now, the other side is actually not ready yet.) In any case, the kernel does not automatically try to enter REPLICATING mode by contacting the other host.

Next, in step 1442, after the new SNDR set is created and enabled, a handle to it is returned to the SNDRBeanSystemManager object. The SNDRBeanSystemManager then contacts, in step 1444, a configuration manager federated bean running on host A (not shown in FIG. 12) in order to indicate that a new SNDR set has been created. The configuration manager federated bean stores the information related to this new SNDR set. This configuration information can be retrieved later. The process then proceeds, via off-page connectors 1446 and 1448, to step 1450.

In step 1450, the SNDRJiroBean 1206 retrieves a second SNDRSystem object from the SNDR management facade associated with the CIM client 1211 that operates with host B 1124 where the data in volume A 1222 will be replicated for this SNDR set. CIM client 1211 contacts the CIM provider 1226 in host B 1224. This contact is made, via the Internet 1214, as indicated schematically by arrow 1232.

In step 1452, an SNDR set is created and enabled on host B 1224 by performing the process similar to that detailed in steps 1436 through 1444. During this process, the SNDR data service layer 1228 is used to create the new SNDR set.

At this point, a new SNDR set has been created and enabled at both hosts 1216 and 1224 and the GUI command issued in step 1404 has been completed. In step 1454, the SNDRJiroBean 1206 uses a form of Remote Method Invocation to retrieve data resulting from the set creation. This data is retrieved from CIM objects 1218 and 1226 and Jiro management facades 1208 and 1209. If the SNDR sets are successfully created, the retrieved set properties are encapsulated in a Java class, SNDRSetProperties.

In step 1456, the set properties encapsulated in the SNDRSetProperties class are extracted and formatted for the JSP.

Finally, in step 1458, an HTML page is generated using JSP technology to create a "operation successfully executed" response page to the user. In particular, the set properties are displayed in a frame on the HTML page. Alternatively, the Java server pages can send requests directly to the SNDRJiroBean 1206 to request particular information to display, thereby bypassing steps 1456 and 1458. The process then finishes in step 1460.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A method for managing remote data replication from a management terminal in a distributed computer system having a primary host with a first storage device connected by a network to a secondary host with a second storage device, the method comprising:
   (a) running in the primary host a first Common Information Model (CIM) object manager containing a first CIM provider that can configure the first storage device for data replication;
   (b) running in the secondary host a second CIM object manager containing a second CIM provider that can configure the second storage device for data replication;
   (c) running in a management server, management facade software including a CIM client that can contact the first and the second CIM providers to control the first and the second CIM providers;
   (d) running in the management server a federated bean that generates method calls to the management facade software; and
   (e) providing data replication commands from the management terminal to the federated bean to cause the federated bean to control the first and second CIM providers to configure the first and second storage devices for data replication.

2. The method of claim 1 wherein the primary host has an operating system with platform-dependent kernel routines and the first storage system is controlled by platform-dependent kernel routines in the operating system and step (a) comprises converting the platform-dependent kernel routines to platform-independent API calls.

3. The method of claim 2 wherein step (a) comprises using the first CIM provider to invoke the platform-independent API calls in order to configure the first storage.

4. The method of claim 1 wherein the secondary host has an operating system with platform-dependent kernel routines and the second storage system is controlled by platform-dependent kernel routines in the operating system and step (b) comprises converting the platform-dependent kernel routines to platform-independent API calls.

5. The method of claim 4 wherein step (b) comprises using the second CIM provider to invoke the platform-independent API calls in order to configure the second storage.

6. The method of claim 1 wherein step (d) comprises using a graphic user interface to control the federated bean.

7. The method of claim 6 wherein the graphic user interface connects to the federated bean via the network.

8. The method of claim 6 wherein the network is the Internet.

9. The method of claim 8 wherein the management terminal comprises a web browser and wherein step (d) comprises using a graphic user interface generated in the web browser to control the federated bean.

10. The method of claim 9 wherein step (d) further comprises using the web browser to contact a lookup service to obtain a proxy to the federated bean.

11. The method of claim 1 wherein step (d) comprises exporting a management interface from the federated bean and using the management interface to generate the data replication commands.

12. Apparatus for managing remote data replication from a management terminal in a distributed computer system having a primary host with a first storage device connected by a network to a secondary host with a second storage device, the apparatus comprising:
   a first Common Information Model (CIM) object manager in the primary host containing a first CIM provider that can configure the first storage device for data replication;
   a second CIM object manager in the secondary host containing a second CIM provider that can configure the second storage device for data replication;
   management facade software running in a management server, the management facade software including a CIM client that can contact the first and the second CIM providers to control the first and the second CIM providers;
   a federated bean running in the management server, the federated bean generating method calls to the management facade software; and apparatus for providing data replication commands from the management terminal to the federated bean to cause the federated bean to control the first and second CIM providers to configure the first and second storage devices for data replication.

13. The apparatus of claim 12 wherein the primary host has an operating system with platform-dependent kernel routines and the first storage system is controlled by platform-dependent kernel routines in the operating system and the first CIM provider comprises a first native interface that converts the platform-dependent kernel routines to platform-independent API calls.

14. The apparatus of claim 13 wherein the first CIM provider comprises a mechanism that invokes the platform-independent API calls in order to configure the first storage.

15. The apparatus of claim 12 wherein the secondary host has an operating system with platform-dependent kernel routines and the second storage system is controlled by platform-dependent kernel routines in the operating system and the second CIM provider comprises a second native interface that converts the platform-dependent kernel routines to platform-independent API calls.

16. The apparatus of claim 15 wherein the second CIM provider comprises a mechanism that invokes the platform-independent API calls in order to configure the second storage.

17. The apparatus of claim 12 wherein the apparatus for providing data replication commands comprises a graphic user interface.

18. The apparatus of claim 17 wherein the graphic user interface connects to the federated bean via the network.

19. The apparatus of claim 18 wherein the network is the Internet.

20. The apparatus of claim 19 wherein the management terminal comprises a web browser and wherein the apparatus for providing data replication commands comprises a graphic user interface generated in the web browser.

21. The apparatus of claim 20 wherein the apparatus for providing data replication commands further comprises a mechanism in the web browser that contacts a lookup service to obtain a proxy to the federated bean.

22. The apparatus of claim 12 wherein the apparatus for providing data replication commands comprises a mechanism that exports a management interface from the federated bean and uses the management interface to generate the data replication commands.

23. A computer program product for managing remote data replication from a management terminal in a distributed computer system having a primary host with a first storage device connected by a network to a secondary host with a second storage device, the computer program product comprising a computer usable medium having computer readable program code thereon, including:

first Common Information Model (CIM) object manager program code operable in the primary host, the first CIM object manager program code including program code for generating a first CIM provider in the primary host, which first CIM provider can configure the first storage device for data replication;

second CIM object manager program code operable in the secondary host, the second CIM object manager code including program code for generating a second CIM provider in the secondary host, which second CIM provider can configure the second storage device for data replication;

management facade software operable in a management server including program code for generating a CIM client that in the management server, which CIM client can contact the first and the second CIM providers to control the first and the second CIM providers;

federated bean software operable in the management server that generates method calls to the management facade software; and program code for providing data replication commands from the management terminal to the federated bean to cause the federated bean to control the first and second CIM providers to configure the first and second storage devices for data replication.

* * * * *